US012031676B2

(12) United States Patent
Craig et al.

(10) Patent No.: US 12,031,676 B2
(45) Date of Patent: Jul. 9, 2024

(54) INSULATION SECUREMENT SYSTEM AND ASSOCIATED METHODS

(71) Applicant: Marathon Petroleum Company LP, Findlay, OH (US)

(72) Inventors: Jon Craig, Knoxville, TN (US); Michael Basic, Laguna Hills, CA (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 828 days.

(21) Appl. No.: 16/828,723

(22) Filed: Mar. 24, 2020

(65) Prior Publication Data
US 2020/0312470 A1 Oct. 1, 2020

Related U.S. Application Data

(60) Provisional application No. 62/823,156, filed on Mar. 25, 2019.

(51) Int. Cl.
*F17C 1/12* (2006.01)
*G21C 11/08* (2006.01)
*G21C 13/02* (2006.01)

(52) U.S. Cl.
CPC ....... *F17C 1/12* (2013.01); *B01J 2219/00155* (2013.01); *G21C 11/08* (2013.01); *G21C 13/02* (2013.01); *Y02E 30/30* (2013.01)

(58) Field of Classification Search
CPC .. F17C 1/12; B01J 2219/00155; G21C 11/08; G21C 13/02; G21C 13/024
(Continued)

(56) References Cited

U.S. PATENT DOCUMENTS

| 981,434 A | 1/1911 | Lander |
| 1,526,301 A | 2/1925 | Stevens |

(Continued)

FOREIGN PATENT DOCUMENTS

| AT | 11772 U1 | 4/2011 |
| BR | PI0701518 | 11/2008 |

(Continued)

OTHER PUBLICATIONS

Lloyd's Register, Using technology to trace the carbon intensity of sustainable marine fuels, Feb. 15, 2023.
(Continued)

*Primary Examiner* — J. Gregory Pickett
*Assistant Examiner* — Niki M Eloshway
(74) *Attorney, Agent, or Firm* — Womble Bond Dickinson (US) LLP

(57) ABSTRACT

Systems and methods for insulating vessels are disclosed. In one or more embodiments, the disclosure provides a vessel insulation system (e.g., for use with a reactor or pressure vessel), which includes a floating ring sized to circumscribe a top nozzle of a vessel; a plurality of straps connected to the floating ring, the plurality of straps extending downward from the floating ring and being positioned to run along a length of the outer shell of the vessel; and a plurality of segmented rings positioned to circumscribe the outer shell of the vessel and connected to the plurality of straps. The plurality of segmented rings is configured to support an insulation material circumscribing the outer shell of the vessel, which can provide effective securement of the insulation material around the outer shell without welding components on the vessel to secure the insulation material.

18 Claims, 11 Drawing Sheets

(58) Field of Classification Search
USPC .................................................... 220/592.2
See application file for complete search history.

(56) References Cited

U.S. PATENT DOCUMENTS

| | | | |
|---|---|---|---|
| 1,572,922 A | 2/1926 | Govers et al. |
| 1,867,143 A | 7/1932 | Fohl |
| 2,401,570 A | 6/1946 | Koehler |
| 2,498,442 A | 2/1950 | Morey |
| 2,516,097 A | 7/1950 | Woodham et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A | 5/1957 | Glanzer |
| 2,804,165 A | 8/1957 | Blomgren |
| 2,867,913 A | 1/1959 | Faucher |
| 2,888,239 A | 5/1959 | Slemmons |
| 2,909,482 A | 10/1959 | Williams et al. |
| 2,925,144 A | 2/1960 | Kroll |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A | 11/1973 | Schneider et al. |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,901,951 A | 8/1975 | Nishizaki |
| 3,906,780 A | 9/1975 | Baldwin |
| 3,912,307 A | 10/1975 | Totman |
| 3,928,172 A | 12/1975 | Davis et al. |
| 3,937,660 A | 2/1976 | Yates et al. |
| 4,006,075 A | 2/1977 | Luckenbach |
| 4,017,214 A | 4/1977 | Smith |
| 4,066,425 A | 1/1978 | Nett |
| 4,085,078 A | 4/1978 | McDonald |
| 4,144,759 A | 3/1979 | Slowik |
| 4,149,756 A | 4/1979 | Tackett |
| 4,151,003 A | 4/1979 | Smith et al. |
| 4,167,492 A | 9/1979 | Varady |
| 4,176,052 A | 11/1979 | Bruce et al. |
| 4,217,116 A | 8/1980 | Seever |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,798,463 A | 11/1989 | Koshi |
| 4,901,751 A | 2/1990 | Story et al. |
| 4,914,249 A | 4/1990 | Benedict |
| 4,916,938 A | 4/1990 | Aikin et al. |
| 4,917,790 A | 4/1990 | Owen |
| 4,923,834 A | 5/1990 | Lomas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |
| 4,972,867 A | 11/1990 | Ruesch |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |
| 5,053,371 A | 10/1991 | Williamson |
| 5,056,758 A | 10/1991 | Bramblet |
| 5,059,305 A | 10/1991 | Sapre |
| 5,061,467 A | 10/1991 | Johnson et al. |
| 5,066,049 A | 11/1991 | Staples |
| 5,076,910 A | 12/1991 | Rush |
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,115,686 A | 5/1992 | Walker et al. |
| 5,121,337 A | 6/1992 | Brown |
| 5,128,109 A | 7/1992 | Owen |
| 5,128,292 A | 7/1992 | Lomas |
| 5,129,624 A | 7/1992 | Icenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |
| 5,160,426 A | 11/1992 | Avidan |
| 5,170,911 A | 12/1992 | Della Riva |

(56) References Cited

U.S. PATENT DOCUMENTS

| | | |
|---|---|---|
| 5,174,250 A | 12/1992 | Lane |
| 5,174,345 A | 12/1992 | Kesterman et al. |
| 5,178,363 A | 1/1993 | Icenhower et al. |
| 5,196,110 A | 3/1993 | Swart et al. |
| 5,201,850 A | 4/1993 | Lenhardt et al. |
| 5,203,370 A | 4/1993 | Block et al. |
| 5,211,838 A | 5/1993 | Staubs et al. |
| 5,212,129 A | 5/1993 | Lomas |
| 5,221,463 A | 6/1993 | Kamienski et al. |
| 5,223,714 A | 6/1993 | Maggard |
| 5,225,679 A | 7/1993 | Clark et al. |
| 5,230,498 A | 7/1993 | Wood et al. |
| 5,235,999 A | 8/1993 | Lindquist et al. |
| 5,236,765 A | 8/1993 | Cordia et al. |
| 5,243,546 A | 9/1993 | Maggard |
| 5,246,860 A | 9/1993 | Hutchins et al. |
| 5,246,868 A | 9/1993 | Busch et al. |
| 5,248,408 A | 9/1993 | Owen |
| 5,250,807 A | 10/1993 | Sontvedt |
| 5,257,530 A | 11/1993 | Beattie et al. |
| 5,258,115 A | 11/1993 | Heck et al. |
| 5,258,117 A | 11/1993 | Kolstad et al. |
| 5,262,645 A | 11/1993 | Lambert et al. |
| 5,263,682 A | 11/1993 | Covert et al. |
| 5,301,560 A | 4/1994 | Anderson et al. |
| 5,302,294 A | 4/1994 | Schubert |
| 5,316,448 A | 5/1994 | Ziegler et al. |
| 5,320,671 A | 6/1994 | Schilling |
| 5,326,074 A | 7/1994 | Spock et al. |
| 5,328,505 A | 7/1994 | Schilling |
| 5,328,591 A | 7/1994 | Raterman |
| 5,332,492 A | 7/1994 | Maurer et al. |
| 5,338,439 A | 8/1994 | Owen et al. |
| 5,348,645 A | 9/1994 | Maggard et al. |
| 5,349,188 A | 9/1994 | Maggard |
| 5,349,189 A | 9/1994 | Maggard |
| 5,354,451 A | 10/1994 | Goldstein et al. |
| 5,354,453 A | 10/1994 | Bhatia |
| 5,361,643 A | 11/1994 | Boyd et al. |
| 5,362,965 A | 11/1994 | Maggard |
| 5,370,146 A | 12/1994 | King et al. |
| 5,370,790 A | 12/1994 | Maggard et al. |
| 5,372,270 A | 12/1994 | Rosenkrantz |
| 5,372,352 A | 12/1994 | Smith et al. |
| 5,381,002 A | 1/1995 | Morrow et al. |
| 5,388,805 A | 2/1995 | Bathrick et al. |
| 5,389,232 A | 2/1995 | Adewuyi et al. |
| 5,404,015 A | 4/1995 | Chimenti et al. |
| 5,415,025 A | 5/1995 | Bartman et al. |
| 5,416,323 A | 5/1995 | Hoots et al. |
| 5,417,843 A | 5/1995 | Swart et al. |
| 5,417,846 A | 5/1995 | Renard |
| 5,423,446 A | 6/1995 | Johnson |
| 5,431,067 A | 7/1995 | Anderson et al. |
| 5,433,120 A | 7/1995 | Boyd et al. |
| 5,435,436 A | 7/1995 | Manley et al. |
| 5,443,716 A | 8/1995 | Anderson et al. |
| 5,446,681 A | 8/1995 | Gethner et al. |
| 5,452,232 A | 9/1995 | Espinosa et al. |
| RE35,046 E | 10/1995 | Hettinger et al. |
| 5,459,677 A | 10/1995 | Kowalski et al. |
| 5,472,875 A | 12/1995 | Monticello |
| 5,474,607 A | 12/1995 | Holleran |
| 5,475,612 A | 12/1995 | Espinosa et al. |
| 5,476,117 A | 12/1995 | Pakula |
| 5,490,085 A | 2/1996 | Lambert et al. |
| 5,492,617 A | 2/1996 | Trimble et al. |
| 5,494,079 A | 2/1996 | Tiedemann |
| 5,507,326 A | 4/1996 | Cadman et al. |
| 5,510,265 A | 4/1996 | Monticello |
| 5,516,969 A | 5/1996 | Krasznai et al. |
| 5,532,487 A | 7/1996 | Brearley et al. |
| 5,540,893 A | 7/1996 | English |
| 5,549,814 A | 8/1996 | Zinke |
| 5,556,222 A | 9/1996 | Chen |
| 5,559,295 A | 9/1996 | Sheryll |
| 5,560,509 A | 10/1996 | Laverman et al. |
| 5,569,808 A | 10/1996 | Cansell et al. |
| 5,573,032 A | 11/1996 | Lenz et al. |
| 5,584,985 A | 12/1996 | Lomas |
| 5,596,196 A | 1/1997 | Cooper et al. |
| 5,600,134 A | 2/1997 | Ashe et al. |
| 5,647,961 A | 7/1997 | Lofland |
| 5,652,145 A | 7/1997 | Cody et al. |
| 5,675,071 A | 10/1997 | Cody et al. |
| 5,684,580 A | 11/1997 | Cooper et al. |
| 5,699,269 A | 12/1997 | Ashe et al. |
| 5,699,270 A | 12/1997 | Ashe et al. |
| 5,712,481 A | 1/1998 | Welch et al. |
| 5,712,797 A | 1/1998 | Descales et al. |
| 5,713,401 A | 2/1998 | Weeks |
| 5,716,055 A | 2/1998 | Wilkinson et al. |
| 5,717,209 A | 2/1998 | Bigman et al. |
| 5,740,073 A | 4/1998 | Bages et al. |
| 5,744,024 A | 4/1998 | Sullivan, III et al. |
| 5,744,702 A | 4/1998 | Roussis et al. |
| 5,746,906 A | 5/1998 | McHenry et al. |
| 5,758,514 A | 6/1998 | Genung et al. |
| 5,763,883 A | 6/1998 | Descales et al. |
| 5,800,697 A | 9/1998 | Lengemann |
| 5,817,517 A | 10/1998 | Perry et al. |
| 5,822,058 A | 10/1998 | Adler-Golden et al. |
| 5,834,539 A | 11/1998 | Krivohlavek |
| 5,837,130 A | 11/1998 | Crossland |
| 5,853,455 A | 12/1998 | Gibson |
| 5,856,869 A | 1/1999 | Cooper et al. |
| 5,858,207 A | 1/1999 | Lomas |
| 5,858,210 A | 1/1999 | Richardson |
| 5,858,212 A | 1/1999 | Darcy |
| 5,861,228 A | 1/1999 | Descales et al. |
| 5,862,060 A | 1/1999 | Murray, Jr. |
| 5,865,441 A | 2/1999 | Orlowski |
| 5,883,363 A | 3/1999 | Motoyoshi et al. |
| 5,885,439 A | 3/1999 | Glover |
| 5,892,228 A | 4/1999 | Cooper et al. |
| 5,895,506 A | 4/1999 | Cook et al. |
| 5,916,433 A | 6/1999 | Tejada et al. |
| 5,919,354 A | 7/1999 | Bartek |
| 5,935,415 A | 8/1999 | Haizmann et al. |
| 5,940,176 A | 8/1999 | Knapp |
| 5,972,171 A | 10/1999 | Ross et al. |
| 5,979,491 A | 11/1999 | Gonsior |
| 5,997,723 A | 12/1999 | Wiehe et al. |
| 6,015,440 A | 1/2000 | Noureddini |
| 6,025,305 A | 2/2000 | Aldrich et al. |
| 6,026,841 A | 2/2000 | Kozik |
| 6,047,602 A | 4/2000 | Lynnworth |
| 6,056,005 A | 5/2000 | Piotrowski et al. |
| 6,062,274 A | 5/2000 | Pettesch |
| 6,063,263 A | 5/2000 | Palmas |
| 6,063,265 A | 5/2000 | Chiyoda et al. |
| 6,070,128 A | 5/2000 | Descales et al. |
| 6,072,576 A | 6/2000 | McDonald et al. |
| 6,076,864 A | 6/2000 | Levivier et al. |
| 6,087,662 A | 7/2000 | Wilt et al. |
| 6,093,867 A | 7/2000 | Ladwig et al. |
| 6,099,607 A | 8/2000 | Haslebacher |
| 6,099,616 A | 8/2000 | Jenne et al. |
| 6,102,655 A | 8/2000 | Kreitmeier |
| 6,105,441 A | 8/2000 | Conner et al. |
| 6,107,631 A | 8/2000 | He |
| 6,117,812 A | 9/2000 | Gao et al. |
| 6,130,095 A | 10/2000 | Shearer |
| 6,140,647 A | 10/2000 | Welch et al. |
| 6,153,091 A | 11/2000 | Sechrist et al. |
| 6,155,294 A | 12/2000 | Cornford et al. |
| 6,162,644 A | 12/2000 | Choi et al. |
| 6,165,350 A | 12/2000 | Lokhandwala et al. |
| 6,169,218 B1 | 1/2001 | Hearn |
| 6,171,052 B1 | 1/2001 | Aschenbruck et al. |
| 6,174,501 B1 | 1/2001 | Noureddini |
| 6,190,535 B1 | 2/2001 | Kalnes et al. |
| 6,203,585 B1 | 3/2001 | Majerczak |
| 6,235,104 B1 | 5/2001 | Chattopadhyay et al. |

(56) References Cited

U.S. PATENT DOCUMENTS

| | | |
|---|---|---|
| 6,258,987 B1 | 7/2001 | Schmidt et al. |
| 6,271,518 B1 | 8/2001 | Boehm et al. |
| 6,274,785 B1 | 8/2001 | Gore |
| 6,284,128 B1 | 9/2001 | Glover et al. |
| 6,296,812 B1 | 10/2001 | Gauthier et al. |
| 6,312,586 B1 | 11/2001 | Kalnes et al. |
| 6,315,815 B1 | 11/2001 | Spadaccini |
| 6,324,895 B1 | 12/2001 | Chitnis et al. |
| 6,328,348 B1 | 12/2001 | Cornford et al. |
| 6,331,436 B1 | 12/2001 | Richardson et al. |
| 6,348,074 B2 | 2/2002 | Wenzel |
| 6,350,371 B1 | 2/2002 | Lokhandwala et al. |
| 6,368,495 B1 | 4/2002 | Kocal et al. |
| 6,382,633 B1 | 5/2002 | Hashiguchi et al. |
| 6,390,673 B1 | 5/2002 | Camburn |
| 6,395,228 B1 | 5/2002 | Maggard et al. |
| 6,398,518 B1 | 6/2002 | Ingistov |
| 6,399,800 B1 | 6/2002 | Haas et al. |
| 6,420,181 B1 | 7/2002 | Novak |
| 6,422,035 B1 | 7/2002 | Phillippe |
| 6,435,279 B1 | 8/2002 | Howe et al. |
| 6,446,446 B1 | 9/2002 | Cowans |
| 6,446,729 B1 | 9/2002 | Bixenman et al. |
| 6,451,197 B1 | 9/2002 | Kalnes |
| 6,454,935 B1 | 9/2002 | Lesieur et al. |
| 6,467,303 B2 | 10/2002 | Ross |
| 6,482,762 B1 | 11/2002 | Ruffin et al. |
| 6,503,460 B1 | 1/2003 | Miller et al. |
| 6,528,047 B2 | 3/2003 | Arif et al. |
| 6,540,797 B1 | 4/2003 | Scott et al. |
| 6,558,531 B2 | 5/2003 | Steffens et al. |
| 6,589,323 B1 | 7/2003 | Korin |
| 6,609,888 B1 | 8/2003 | Ingistov |
| 6,622,490 B2 | 9/2003 | Ingistov |
| 6,644,935 B2 | 11/2003 | Ingistov |
| 6,660,895 B1 | 12/2003 | Brunet et al. |
| 6,672,858 B1 | 1/2004 | Benson et al. |
| 6,733,232 B2 | 5/2004 | Ingistov et al. |
| 6,733,237 B2 | 5/2004 | Ingistov |
| 6,736,961 B2 | 5/2004 | Plummer et al. |
| 6,740,226 B2 | 5/2004 | Mehra et al. |
| 6,772,581 B2 | 8/2004 | Ojiro et al. |
| 6,772,741 B1 | 8/2004 | Pittel et al. |
| 6,814,941 B1 | 11/2004 | Naunheimer et al. |
| 6,824,673 B1 | 11/2004 | Ellis et al. |
| 6,827,841 B2 | 12/2004 | Kiser et al. |
| 6,835,223 B2 | 12/2004 | Walker et al. |
| 6,841,133 B2 | 1/2005 | Niewiedzial et al. |
| 6,842,702 B2 | 1/2005 | Haaland et al. |
| 6,854,346 B2 | 2/2005 | Nimberger |
| 6,858,128 B1 | 2/2005 | Hoehn et al. |
| 6,866,771 B2 | 3/2005 | Lomas et al. |
| 6,869,521 B2 | 3/2005 | Lomas |
| 6,897,071 B2 | 5/2005 | Sonbul |
| 6,962,484 B2 | 11/2005 | Brandl et al. |
| 7,013,718 B2 | 3/2006 | Ingistov et al. |
| 7,035,767 B2 | 4/2006 | Archer et al. |
| 7,048,254 B2 | 5/2006 | Laurent et al. |
| 7,074,321 B1 | 7/2006 | Kalnes |
| 7,078,005 B2 | 7/2006 | Smith et al. |
| 7,087,153 B1 | 8/2006 | Kalnes |
| 7,156,123 B2 | 1/2007 | Welker et al. |
| 7,172,686 B1 | 2/2007 | Ji et al. |
| 7,174,715 B2 | 2/2007 | Armitage et al. |
| 7,194,369 B2 | 3/2007 | Lundstedt et al. |
| 7,213,413 B2 | 5/2007 | Battiste et al. |
| 7,225,840 B1 | 6/2007 | Craig et al. |
| 7,228,250 B2 | 6/2007 | Naiman et al. |
| 7,244,350 B2 | 7/2007 | Kar et al. |
| 7,252,755 B2 | 8/2007 | Kiser et al. |
| 7,255,531 B2 | 8/2007 | Ingistov |
| 7,260,499 B2 | 8/2007 | Watzke et al. |
| 7,291,257 B2 | 11/2007 | Ackerson et al. |
| 7,332,132 B2 | 2/2008 | Hedrick et al. |
| 7,404,411 B2 | 7/2008 | Welch et al. |
| 7,419,583 B2 | 9/2008 | Nieskens et al. |
| 7,445,936 B2 | 11/2008 | O'Connor et al. |
| 7,459,081 B2 | 12/2008 | Koenig |
| 7,485,801 B1 | 2/2009 | Pulter et al. |
| 7,487,955 B1 | 2/2009 | Buercklin |
| 7,501,285 B1 | 3/2009 | Triche et al. |
| 7,551,420 B2 | 6/2009 | Cerqueira et al. |
| 7,571,765 B2 | 8/2009 | Themig |
| 7,637,970 B1 | 12/2009 | Fox et al. |
| 7,669,653 B2 | 3/2010 | Craster et al. |
| 7,682,501 B2 | 3/2010 | Soni et al. |
| 7,686,280 B2 | 3/2010 | Lowery |
| 7,857,964 B2 | 12/2010 | Mashiko et al. |
| 7,866,346 B1 | 1/2011 | Walters |
| 7,895,011 B2 | 2/2011 | Youssefi et al. |
| 7,914,601 B2 | 3/2011 | Farr et al. |
| 7,931,803 B2 | 4/2011 | Buchanan |
| 7,932,424 B2 | 4/2011 | Fujimoto et al. |
| 7,939,335 B1 | 5/2011 | Triche et al. |
| 7,981,361 B2 | 7/2011 | Bacik |
| 7,988,753 B1 | 8/2011 | Fox et al. |
| 7,993,514 B2 | 8/2011 | Schlueter |
| 8,007,662 B2 | 8/2011 | Lomas et al. |
| 8,017,910 B2 | 9/2011 | Sharpe |
| 8,029,662 B2 | 10/2011 | Varma et al. |
| 8,037,938 B2 | 10/2011 | Jardim De Azevedo et al. |
| 8,038,774 B2 | 10/2011 | Peng |
| 8,064,052 B2 | 11/2011 | Feitisch et al. |
| 8,066,867 B2 | 11/2011 | Dziabala |
| 8,080,426 B1 | 12/2011 | Moore et al. |
| 8,127,845 B2 | 3/2012 | Assal |
| 8,193,401 B2 | 6/2012 | McGehee et al. |
| 8,236,566 B2 | 8/2012 | Carpenter et al. |
| 8,286,673 B1 | 10/2012 | Recker et al. |
| 8,354,065 B1 | 1/2013 | Sexton |
| 8,360,118 B2 | 1/2013 | Fleischer et al. |
| 8,370,082 B2 | 2/2013 | De Peinder et al. |
| 8,388,830 B2 | 3/2013 | Sohn et al. |
| 8,389,285 B2 | 3/2013 | Carpenter et al. |
| 8,397,803 B2 | 3/2013 | Crabb et al. |
| 8,397,820 B2 | 3/2013 | Fehr et al. |
| 8,404,103 B2 | 3/2013 | Dziabala |
| 8,434,800 B1 | 5/2013 | LeBlanc |
| 8,481,942 B2 | 7/2013 | Mertens |
| 8,506,656 B1 | 8/2013 | Turocy |
| 8,518,131 B2 | 8/2013 | Mattingly et al. |
| 8,524,180 B2 | 9/2013 | Canari et al. |
| 8,569,068 B2 | 10/2013 | Carpenter et al. |
| 8,579,139 B1 | 11/2013 | Sablak |
| 8,591,814 B2 | 11/2013 | Hodges |
| 8,609,048 B1 | 12/2013 | Beadle |
| 8,647,415 B1 | 2/2014 | De Haan et al. |
| 8,670,945 B2 | 3/2014 | van Schie |
| 8,685,232 B2 | 4/2014 | Mandal et al. |
| 8,735,820 B2 | 5/2014 | Mertens |
| 8,753,502 B1 | 6/2014 | Sexton et al. |
| 8,764,970 B1 | 7/2014 | Moore et al. |
| 8,778,823 B1 | 7/2014 | Oyekan et al. |
| 8,781,757 B2 | 7/2014 | Farquharson et al. |
| 8,829,258 B2 | 9/2014 | Gong et al. |
| 8,916,041 B2 | 12/2014 | Van Den Berg et al. |
| 8,932,458 B1 | 1/2015 | Gianzon et al. |
| 8,986,402 B2 | 3/2015 | Kelly |
| 8,987,537 B1 | 3/2015 | Droubi et al. |
| 8,999,011 B2 | 4/2015 | Stern et al. |
| 8,999,012 B2 | 4/2015 | Kelly et al. |
| 9,011,674 B2 | 4/2015 | Milam et al. |
| 9,057,035 B1 | 6/2015 | Kraus et al. |
| 9,097,423 B2 | 8/2015 | Kraus et al. |
| 9,109,176 B2 | 8/2015 | Stern et al. |
| 9,109,177 B2 | 8/2015 | Freel et al. |
| 9,138,738 B2 | 9/2015 | Glover et al. |
| 9,216,376 B2 | 12/2015 | Liu et al. |
| 9,272,241 B2 | 3/2016 | Königsson |
| 9,273,867 B2 | 3/2016 | Buzinski et al. |
| 9,279,748 B1 | 3/2016 | Hughes et al. |
| 9,289,715 B2 | 3/2016 | Høy-Petersen et al. |
| 9,315,403 B1 | 4/2016 | Laur et al. |
| 9,371,493 B1 | 6/2016 | Oyekan |

(56) References Cited

U.S. PATENT DOCUMENTS

| | | |
|---|---|---|
| 9,371,494 B2 | 6/2016 | Oyekan et al. |
| 9,377,340 B2 | 6/2016 | Hägg |
| 9,393,520 B2 | 7/2016 | Gomez |
| 9,410,102 B2 | 8/2016 | Eaton et al. |
| 9,428,695 B2 | 8/2016 | Narayanaswamy et al. |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,500,300 B2 | 11/2016 | Daigle |
| 9,506,649 B2 | 11/2016 | Rennie et al. |
| 9,580,662 B1 | 2/2017 | Moore |
| 9,624,448 B2 | 4/2017 | Joo et al. |
| 9,650,580 B2 | 5/2017 | Merdrignac et al. |
| 9,657,241 B2 | 5/2017 | Craig et al. |
| 9,662,597 B1 | 5/2017 | Formoso |
| 9,663,729 B2 | 5/2017 | Baird et al. |
| 9,665,693 B2 | 5/2017 | Saeger et al. |
| 9,709,545 B2 | 7/2017 | Mertens |
| 9,757,686 B2 | 9/2017 | Peng |
| 9,789,290 B2 | 10/2017 | Forsell |
| 9,803,152 B2 | 10/2017 | Kar et al. |
| 9,834,731 B2 | 12/2017 | Weiss et al. |
| 9,840,674 B2 | 12/2017 | Weiss et al. |
| 9,873,080 B2 | 1/2018 | Richardson |
| 9,878,300 B2 | 1/2018 | Norling |
| 9,890,907 B1 | 2/2018 | Highfield et al. |
| 9,891,198 B2 | 2/2018 | Sutan |
| 9,895,649 B2 | 2/2018 | Brown et al. |
| 9,896,630 B2 | 2/2018 | Weiss et al. |
| 9,914,094 B2 | 3/2018 | Jenkins et al. |
| 9,920,270 B2 | 3/2018 | Robinson et al. |
| 9,925,486 B1 | 3/2018 | Botti |
| 9,982,788 B1 | 5/2018 | Maron |
| 10,047,299 B2 | 8/2018 | Rubin-Pitel et al. |
| 10,087,397 B2 | 10/2018 | Phillips et al. |
| 10,099,175 B2 | 10/2018 | Takashashi et al. |
| 10,150,078 B2 | 12/2018 | Komatsu et al. |
| 10,228,708 B2 | 3/2019 | Lambert et al. |
| 10,239,034 B1 | 3/2019 | Sexton |
| 10,253,269 B2 | 4/2019 | Cantley et al. |
| 10,266,779 B2 | 4/2019 | Weiss et al. |
| 10,295,521 B2 | 5/2019 | Mertens |
| 10,308,884 B2 | 6/2019 | Klussman |
| 10,316,263 B2 | 6/2019 | Rubin-Pitel et al. |
| 10,384,157 B2 | 8/2019 | Balcik |
| 10,435,339 B2 | 10/2019 | Larsen et al. |
| 10,435,636 B2 | 10/2019 | Johnson et al. |
| 10,443,000 B2 | 10/2019 | Lomas |
| 10,443,006 B1 | 10/2019 | Fruchey et al. |
| 10,457,881 B2 | 10/2019 | Droubi et al. |
| 10,479,943 B1 | 11/2019 | Liu et al. |
| 10,494,579 B2 | 12/2019 | Wrigley et al. |
| 10,495,570 B2 | 12/2019 | Owen et al. |
| 10,501,699 B2 | 12/2019 | Robinson et al. |
| 10,526,547 B2 | 1/2020 | Larsen et al. |
| 10,533,141 B2 | 1/2020 | Moore et al. |
| 10,563,130 B2 | 2/2020 | Narayanaswamy et al. |
| 10,563,132 B2 | 2/2020 | Moore et al. |
| 10,563,133 B2 | 2/2020 | Moore et al. |
| 10,570,078 B2 | 2/2020 | Larsen et al. |
| 10,577,551 B2 | 3/2020 | Kraus et al. |
| 10,584,287 B2 | 3/2020 | Klussman et al. |
| 10,604,709 B2 | 3/2020 | Moore et al. |
| 10,640,719 B2 | 5/2020 | Freel et al. |
| 10,655,074 B2 | 5/2020 | Moore et al. |
| 10,696,906 B2 | 6/2020 | Cantley et al. |
| 10,808,184 B1 | 10/2020 | Moore |
| 10,836,966 B2 | 11/2020 | Moore et al. |
| 10,876,053 B2 | 12/2020 | Klussman et al. |
| 10,954,456 B2 | 3/2021 | Moore et al. |
| 10,961,468 B2 | 3/2021 | Moore et al. |
| 10,962,259 B2 | 3/2021 | Shah et al. |
| 10,968,403 B2 | 4/2021 | Moore |
| 11,021,662 B2 | 6/2021 | Moore et al. |
| 11,098,255 B2 | 8/2021 | Larsen et al. |
| 11,124,714 B2 | 9/2021 | Eller et al. |
| 11,136,513 B2 | 10/2021 | Moore et al. |
| 11,164,406 B2 | 11/2021 | Meroux et al. |
| 11,168,270 B1 | 11/2021 | Moore |
| 11,175,039 B2 | 11/2021 | Lochschmied et al. |
| 11,203,719 B2 | 12/2021 | Cantley et al. |
| 11,203,722 B2 | 12/2021 | Moore et al. |
| 11,214,741 B2 | 1/2022 | Davdov et al. |
| 11,306,253 B2 | 4/2022 | Timken et al. |
| 11,319,262 B2 | 5/2022 | Wu et al. |
| 11,352,577 B2 | 6/2022 | Woodchick et al. |
| 11,352,578 B2 | 6/2022 | Eller et al. |
| 11,384,301 B2 | 7/2022 | Eller et al. |
| 11,421,162 B2 | 8/2022 | Pradeep et al. |
| 11,460,478 B2 | 10/2022 | Sugiyama et al. |
| 11,467,172 B1 | 10/2022 | Mitzel et al. |
| 11,542,441 B2 | 1/2023 | Larsen et al. |
| 11,578,638 B2 | 2/2023 | Thobe |
| 11,634,647 B2 | 4/2023 | Cantley et al. |
| 11,667,858 B2 | 6/2023 | Eller et al. |
| 11,692,141 B2 | 7/2023 | Larsen et al. |
| 11,702,600 B2 | 7/2023 | Sexton et al. |
| 11,715,950 B2 | 8/2023 | Miller et al. |
| 11,720,526 B2 | 8/2023 | Miller et al. |
| 11,802,257 B2 | 10/2023 | Short et al. |
| 11,835,450 B2 | 12/2023 | Bledsoe, Jr. et al. |
| 11,860,069 B2 | 1/2024 | Bledsoe, Jr. |
| 11,891,581 B2 | 2/2024 | Cantley et al. |
| 11,898,109 B2 | 2/2024 | Sexton et al. |
| 11,905,468 B2 | 2/2024 | Sexton et al. |
| 11,905,479 B2 | 2/2024 | Eller et al. |
| 11,906,423 B2 | 2/2024 | Bledsoe, Jr. et al. |
| 11,920,096 B2 | 3/2024 | Woodchick et al. |
| 11,921,035 B2 | 3/2024 | Bledsoe, Jr. et al. |
| 11,970,664 B2 | 4/2024 | Larsen |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |
| 2003/0113598 A1 | 6/2003 | Chow et al. |
| 2003/0188536 A1 | 10/2003 | Mittricker |
| 2003/0194322 A1 | 10/2003 | Brandl et al. |
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1 | 7/2004 | Entezarian |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |
| 2005/0139516 A1 | 6/2005 | Nieskens et al. |
| 2005/0143609 A1 | 6/2005 | Wolf et al. |
| 2005/0150820 A1 | 7/2005 | Guo |
| 2005/0229777 A1 | 10/2005 | Brown |
| 2006/0037237 A1 | 2/2006 | Copeland et al. |
| 2006/0042701 A1 | 3/2006 | Jansen |
| 2006/0049082 A1 | 3/2006 | Niccum et al. |
| 2006/0091059 A1 | 5/2006 | Barbaro |
| 2006/0162243 A1 | 7/2006 | Wolf |
| 2006/0169305 A1 | 8/2006 | Jansen et al. |
| 2006/0210456 A1 | 9/2006 | Bruggendick |
| 2006/0169064 A1 | 10/2006 | Anschutz et al. |
| 2006/0220383 A1 | 10/2006 | Erickson |
| 2007/0003450 A1 | 1/2007 | Burdett et al. |
| 2007/0082407 A1 | 4/2007 | Little, III |
| 2007/0112258 A1 | 5/2007 | Soyemi et al. |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |
| 2008/0078694 A1 | 4/2008 | Sexton et al. |

(56) References Cited

U.S. PATENT DOCUMENTS

| | | |
|---|---|---|
| 2008/0078695 A1 | 4/2008 | Sexton et al. |
| 2008/0081844 A1 | 4/2008 | Shires et al. |
| 2008/0087592 A1 | 4/2008 | Buchanan |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1 | 7/2010 | Bacik |
| 2010/0243235 A1 | 9/2010 | Caldwell et al. |
| 2010/0301044 A1 | 12/2010 | Sprecher |
| 2010/0318118 A1 | 12/2010 | Forsell |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2012/0222550 A1 | 9/2012 | Ellis |
| 2012/0272715 A1 | 11/2012 | Kriel et al. |
| 2013/0014431 A1 | 1/2013 | Jin et al. |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0186739 A1 | 7/2013 | Trompiz |
| 2013/0192339 A1 | 8/2013 | Kriel et al. |
| 2013/0225897 A1 | 8/2013 | Candelon et al. |
| 2013/0288355 A1 | 10/2013 | DeWitte et al. |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0041150 A1 | 2/2014 | Sjoberg |
| 2014/0121428 A1 | 5/2014 | Wang et al. |
| 2014/0229010 A1 | 8/2014 | Farquharson et al. |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0034570 A1 | 2/2015 | Andreussi |
| 2015/0034599 A1 | 2/2015 | Hunger et al. |
| 2015/0057477 A1 | 2/2015 | Ellig et al. |
| 2015/0071028 A1 | 3/2015 | Glanville |
| 2015/0122704 A1 | 5/2015 | Kumar et al. |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0045918 A1 | 2/2016 | Lapham |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0175749 A1 | 6/2016 | Suda |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |
| 2017/0115190 A1 | 4/2017 | Hall et al. |
| 2017/0131728 A1 | 5/2017 | Lambert et al. |
| 2017/0151526 A1 | 6/2017 | Cole |
| 2017/0183575 A1 | 6/2017 | Rubin-Pitel et al. |
| 2017/0198910 A1 | 7/2017 | Garg |
| 2017/0226434 A1 | 8/2017 | Zimmerman |
| 2017/0233670 A1 | 8/2017 | Feustel et al. |
| 2017/0269559 A1 | 9/2017 | Trygstad |
| 2018/0017469 A1 | 1/2018 | English et al. |
| 2018/0037308 A1 | 2/2018 | Lee et al. |
| 2018/0080958 A1 | 3/2018 | Marchese et al. |
| 2018/0119039 A1 | 5/2018 | Tanaka et al. |
| 2018/0134974 A1 | 5/2018 | Weiss et al. |
| 2018/0163144 A1 | 6/2018 | Weiss et al. |
| 2018/0179457 A1 | 6/2018 | Mukherjee et al. |
| 2018/0202607 A1* | 7/2018 | Mcbride .................. B67D 1/00 |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra e Mello et al. |
| 2018/0371325 A1 | 12/2018 | Streiff et al. |
| 2019/0002772 A1 | 1/2019 | Moore et al. |
| 2019/0010405 A1 | 1/2019 | Moore et al. |
| 2019/0010408 A1 | 1/2019 | Moore et al. |
| 2019/0016980 A1 | 1/2019 | Kar et al. |
| 2019/0093026 A1 | 3/2019 | Wohaibi et al. |
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |
| 2019/0233741 A1 | 8/2019 | Moore et al. |
| 2019/0292465 A1* | 9/2019 | Mcbride .................. F16L 59/12 |
| 2019/0338205 A1 | 11/2019 | Ackerson et al. |
| 2019/0382668 A1 | 12/2019 | Klussman et al. |
| 2019/0382672 A1 | 12/2019 | Sorensen |
| 2020/0041481 A1 | 2/2020 | Burgess |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0123458 A1 | 4/2020 | Moore et al. |
| 2020/0181502 A1 | 6/2020 | Paasikallio et al. |
| 2020/0199462 A1 | 6/2020 | Klussman et al. |
| 2020/0208068 A1 | 7/2020 | Hossain et al. |
| 2020/0246743 A1 | 8/2020 | Sorensen |
| 2020/0291316 A1 | 9/2020 | Robbins et al. |
| 2020/0312470 A1 | 10/2020 | Craig et al. |
| 2020/0316513 A1 | 10/2020 | Zhao |
| 2020/0332198 A1 | 10/2020 | Yang et al. |
| 2020/0353456 A1 | 11/2020 | Zalewski et al. |
| 2020/0378600 A1 | 12/2020 | Craig et al. |
| 2020/0385644 A1 | 12/2020 | Rogel et al. |
| 2021/0002559 A1 | 1/2021 | Larsen et al. |
| 2021/0003502 A1 | 1/2021 | Kirchmann et al. |
| 2021/0033631 A1 | 2/2021 | Field et al. |
| 2021/0103304 A1 | 4/2021 | Fogarty et al. |
| 2021/0115344 A1 | 4/2021 | Perkins et al. |
| 2021/0181164 A1 | 6/2021 | Shirkhan et al. |
| 2021/0213382 A1 | 7/2021 | Cole |
| 2021/0238487 A1 | 8/2021 | Moore et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |

(56) References Cited

U.S. PATENT DOCUMENTS

| | | | |
|---|---|---|---|
| 2021/0292661 A1 | 9/2021 | Klussman et al. |
| 2021/0301210 A1 | 9/2021 | Timken et al. |
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0041940 A1 | 2/2022 | Pradeep et al. |
| 2022/0048019 A1 | 2/2022 | Zalewski et al. |
| 2022/0268694 A1 | 8/2022 | Bledsoe et al. |
| 2022/0298440 A1 | 9/2022 | Woodchick et al. |
| 2022/0299170 A1 | 9/2022 | Raynor et al. |
| 2022/0343229 A1 | 10/2022 | Gruber et al. |
| 2022/0357303 A1 | 11/2022 | Zhu et al. |
| 2023/0015077 A1 | 1/2023 | Kim |
| 2023/0078852 A1 | 3/2023 | Campbell et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |
| 2023/0220286 A1 | 7/2023 | Cantley et al. |
| 2023/0241548 A1 | 8/2023 | Holland et al. |
| 2023/0242837 A1 | 8/2023 | Short et al. |
| 2023/0259080 A1 | 8/2023 | Whikehart et al. |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0332058 A1 | 10/2023 | Larsen et al. |
| 2023/0357649 A1 | 11/2023 | Sexton et al. |
| 2023/0400184 A1 | 12/2023 | Craig |
| 2023/0416615 A1 | 12/2023 | Larsen |
| 2023/0416638 A1 | 12/2023 | Short |
| 2024/0011898 A1 | 1/2024 | Bledsoe, Jr. et al. |
| 2024/0115996 A1 | 4/2024 | Rudd |
| 2024/0117262 A1 | 4/2024 | Eller |
| 2024/0118194 A1 | 4/2024 | Bledsoe, Jr. |
| 2024/0124790 A1 | 4/2024 | Sexton |
| 2024/0132786 A1 | 4/2024 | Sexton |

FOREIGN PATENT DOCUMENTS

| | | | |
|---|---|---|---|
| CA | 2949201 | 11/2015 | |
| CA | 2822742 | 12/2016 | |
| CA | 3009808 | 7/2017 | |
| CA | 2904903 | 8/2020 | |
| CA | 3077045 A1 * | 9/2020 | ............ G21C 11/08 |
| CA | 2947431 | 3/2021 | |
| CA | 3004712 | 6/2021 | |
| CA | 2980055 | 12/2021 | |
| CA | 2879783 | 1/2022 | |
| CA | 2991614 | 1/2022 | |
| CA | 2980069 | 11/2022 | |
| CA | 3109606 | 12/2022 | |
| CH | 432129 | 3/1967 | |
| CN | 2128346 | 3/1993 | |
| CN | 201264907 Y | 7/2009 | |
| CN | 201306736 | 9/2009 | |
| CN | 201940168 | 8/2011 | |
| CN | 102120138 | 12/2012 | |
| CN | 203453713 U * | 2/2014 | |
| CN | 203629938 | 6/2014 | |
| CN | 203816490 | 9/2014 | |
| CN | 104353357 | 2/2015 | |
| CN | 204170623 | 2/2015 | |
| CN | 103331093 | 4/2015 | |
| CN | 204253221 | 4/2015 | |
| CN | 204265565 | 4/2015 | |
| CN | 105148728 | 12/2015 | |
| CN | 204824775 | 12/2015 | |
| CN | 103933845 | 1/2016 | |
| CN | 105289241 | 2/2016 | |
| CN | 105536486 | 5/2016 | |
| CN | 105804900 | 7/2016 | |
| CN | 103573430 | 8/2016 | |
| CN | 205655095 U * | 10/2016 | |
| CN | 104326604 | 11/2016 | |
| CN | 104358627 | 11/2016 | |
| CN | 106237802 | 12/2016 | |
| CN | 205779365 | 12/2016 | |
| CN | 106407648 | 2/2017 | |
| CN | 105778987 | 8/2017 | |
| CN | 207179722 | 4/2018 | |
| CN | 207395575 | 5/2018 | |
| CN | 108179022 | 6/2018 | |
| CN | 108704478 | 10/2018 | |
| CN | 109126458 | 1/2019 | |
| CN | 109423345 | 3/2019 | |
| CN | 109499365 | 3/2019 | |
| CN | 109705939 | 5/2019 | |
| CN | 109722303 | 5/2019 | |
| CN | 110129103 | 8/2019 | |
| CN | 110229686 | 9/2019 | |
| CN | 209451617 | 10/2019 | |
| CN | 110987862 | 4/2020 | |
| CN | 111336612 A | 6/2020 | |
| CN | 213824075 U | 7/2021 | |
| CN | 215263512 U | 12/2021 | |
| CN | 215288592 | 12/2021 | |
| CN | 113963818 A * | 1/2022 | |
| CN | 114001278 | 2/2022 | |
| CN | 217431673 | 9/2022 | |
| CN | 218565442 | 3/2023 | |
| DE | 10179 | 6/1912 | |
| DE | 3721725 | 1/1989 | |
| DE | 19619722 | 11/1997 | |
| DE | 102010017563 | 12/2011 | |
| DE | 102014009231 A1 | 1/2016 | |
| EP | 0142352 | 5/1985 | |
| EP | 0527000 | 2/1993 | |
| EP | 0783910 A1 | 7/1997 | |
| EP | 09049318 | 10/1999 | |
| EP | 0783910 B1 | 12/2000 | |
| EP | 0801299 | 3/2004 | |
| EP | 1413712 | 4/2004 | |
| EP | 1600491 | 11/2005 | |
| EP | 1870153 | 12/2007 | |
| EP | 2047905 | 4/2009 | |
| EP | 2955345 | 12/2015 | |
| EP | 3130773 | 2/2017 | |
| EP | 3139009 | 3/2017 | |
| EP | 3239483 | 11/2017 | |
| EP | 3085910 | 8/2018 | |
| EP | 3355056 | 8/2018 | |
| EP | 2998529 | 2/2019 | |
| EP | 3441442 | 2/2019 | |
| EP | 3569988 | 11/2019 | |
| EP | 3878926 | 9/2021 | |
| FR | 2357630 | 2/1978 | |
| FR | 3004722 | 3/2016 | |
| FR | 3027909 | 5/2016 | |
| FR | 3067036 | 12/2018 | |
| FR | 3067037 | 12/2018 | |
| FR | 3072684 | 4/2019 | |
| FR | 3075808 | 6/2019 | |
| GB | 775273 | 5/1957 | |
| GB | 933618 | 8/1963 | |
| GB | 1207719 | 10/1970 | |
| GB | 2144526 | 3/1985 | |
| IN | 202111016535 | 7/2021 | |
| JP | 59220609 | 12/1984 | |
| JP | 2003129067 | 5/2003 | |
| JP | 3160405 | 6/2010 | |
| JP | 2015059220 | 3/2015 | |
| JP | 2019014275 | 1/2019 | |
| KR | 101751923 | 7/2017 | |
| KR | 101823897 | 3/2018 | |
| KR | 20180095303 | 8/2018 | |
| KR | 20190004474 | 1/2019 | |
| KR | 20190004475 | 1/2019 | |
| RU | 2673558 | 11/2018 | |
| RU | 2700705 | 9/2019 | |

(56) References Cited

FOREIGN PATENT DOCUMENTS

| | | |
|---|---|---|
| RU | 2760879 | 12/2021 |
| TW | 320682 | 11/1997 |
| WO | 94/08225 | 4/1994 |
| WO | 199640436 | 12/1996 |
| WO | 1997033678 | 9/1997 |
| WO | 199803249 | 1/1998 |
| WO | 1999041591 | 8/1999 |
| WO | 2001051588 | 7/2001 |
| WO | 2002038295 | 5/2002 |
| WO | 2006126978 | 11/2006 |
| WO | 2008088294 | 7/2008 |
| WO | 2010/144191 | 12/2010 |
| WO | 2012026302 | 3/2012 |
| WO | 2012062924 | 5/2012 |
| WO | 2012089776 | 7/2012 |
| WO | 2012108584 | 8/2012 |
| WO | 2014053431 | 4/2014 |
| WO | 2014096703 | 6/2014 |
| WO | 2014096704 | 6/2014 |
| WO | 2014191004 | 7/2014 |
| WO | 2014177424 | 11/2014 |
| WO | 2014202815 | 12/2014 |
| WO | 2016167708 | 10/2016 |
| WO | 2017067088 | 4/2017 |
| WO | 2017207976 | 12/2017 |
| WO | 2018017664 | 1/2018 |
| WO | 2018073018 | 4/2018 |
| WO | 2018122274 | 7/2018 |
| WO | 2018148675 | 8/2018 |
| WO | 2018148681 | 8/2018 |
| WO | 2018231105 | 12/2018 |
| WO | 2019053323 | 3/2019 |
| WO | 2019104243 | 5/2019 |
| WO | 2019155183 | 8/2019 |
| WO | 2019178701 | 9/2019 |
| WO | 2020035797 | 2/2020 |
| WO | 2020160004 | 8/2020 |
| WO | 2021058289 | 4/2021 |
| WO | 2022133359 | 6/2022 |
| WO | 2022144495 | 7/2022 |
| WO | 2022149501 | 7/2022 |
| WO | 2022219234 | 10/2022 |
| WO | 2022220991 | 10/2022 |
| WO | 2023038579 | 3/2023 |
| WO | 2023137304 | 7/2023 |
| WO | 2023164683 | 8/2023 |
| WO | 2023242308 | 12/2023 |

OTHER PUBLICATIONS

Bollas et al., "Modeling Small-Diameter FCC Riser Reactors. A Hydrodynamic and Kinetic Approach", Industrial and Engineering Chemistry Research, 41(22), 5410-5419, 2002.
Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.
"Development of Model Equations for Predicting Gasoline Blending Properties", Odula et al., American Journal of Chemical Engineering, vol. 3, No. 2-1, 2015, pp. 9-17.
Swagelok, Grab Sampling Systems Application Guide, 53 pages.
Frank et al., "Fuel Tank and Charcoal Canister Fire Hazards during EVAP System Leak Testing", SAE International, 2007 World Congress, Detroit, Michigan, Apr. 16-19, 2007, 11 pages.
Doolin et al., "Catalyst Regeneration and Continuous Reforming Issues", Catalytic Naptha Reforming, 2004.
Platvoet et al., Process Burners 101, American Institute of Chemical Engineers, Aug. 2013.
Luyben, W. L., Process Modeling, Simulation, and Control for Chemical Engineers, Feedforward Control, pp. 431-433.
Cooper et al., Calibration transfer of near-IR partial least squares property models of fuels using standards, Wiley Online Library, Jul. 19, 2011.

ABB Measurement & Analytics, Using FT-NIR as a Multi-Stream Method for CDU Optimization, Nov. 8, 2018.
Modcon Systems LTD., On-Line NIR Analysis of Crude Distillation Unit, Jun. 2008.
ABB Measurement & Analytics, Crude distillation unit (CDU) optimization, 2017.
Guided Wave Inc., The Role of NIR Process Analyzers in Refineries to Process Crude Oil into Useable Petrochemical Products, 2021.
ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.
Bueno, Alexis et al., Characterization of Catalytic Reforming Streams by NIR Spectroscopy, Energy & Fuels 2009, 23, 3172-3177, Apr. 29, 2009.
Caricato, Enrico et al, Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.
Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.
Rodriguez, Elena et al., Coke deposition and product distribution in the co-cracking of waste polyolefin derived streams and vacuum gas oil under FCC unit conditions, Fuel Processing Technology 192 (2019), 130-139.
Passamonti, Francisco J. et al., Recycling of waste plastics into fuels, PDPE conversion in FCC, Applied Catalysis B: Environmental 125 (2012), 499-506.
De Rezende Pinho, Andrea et al., Fast pyrolysis oil from pinewood chips co-processing with vacuum gas oil in an FCC unit for second generation fuel production, Fuel 188 (2017), 462-473.
Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.
Hanson et al., An atmospheric crude tower revamp, Digital Refining, Article, Jul. 2005.
Lopiccolo, Philip, Coke trap reduces FCC slurry exchanger fouling for Texas refiner, Oil & Gas Journal, Sep. 8, 2003.
Martino, Germain, Catalytic Reforming, Petroleum Refining Conversion Processes, vol. 3, Chapter 4, pp. 101-168, 2001.
Baukal et al., Natural-Draft Burners, Industrial Burners Handbook, CRC Press 2003.
Spekuljak et al., Fluid Distributors for Structured Packing Colums, AICHE, Nov. 1998.
Hemler et al., UOP Fluid Catalytic Cracking Process, Handbook of Petroleum Refining Processes, 3rd ed., McGraw Hill, 2004.
United States Department of Agriculture, NIR helps Turn Vegetable Oil into High-Quality Biofuel, Agricultural Research Service, Jun. 15, 1999.
NPRA, 2006 Cat Cracker Seminar Transcript, National Petrochemical & Refiners Association, Aug. 1-2, 2006.
Niccum, Phillip K. et al. KBR, CatCracking.com, More Production—Less Risk!, Twenty Questions: Identify Probably Cuase of High FCC Catalyst Loss, May 3-6, 2011.
NPRA, Cat-10-105 Troubleshooting FCC Catalyst Losses, National Petrochemical & Refiners Association, Aug. 24-25, 2010.
Fraser, Stuart, Distillation in Refining, Distillation Operation and Applications (2014), pp. 155-190 (Year: 2014).
Yasin et al., Quality and chemistry of crude oils, Journal of Petroleum Technology and Alternative Fuels, vol. 4(3), pp. 53-63, Mar. 2013.
Penn State, Cut Points, https://www.e-education.psu.edu/fsc432/content/cut-points, 2018.
The American Petroleum Institute, Petroleum HPV Testing Group, Heavy Fuel Oils Category Analysis and Hazard Characterization, Dec. 7, 2012.
Increase Gasoline Octane and Light Olefin Yeilds with ZSM-5, vol. 5, Issue 5, http://www.refiningonline.com/engelhardkb/crep/TCR4_35.htm.

(56) References Cited

OTHER PUBLICATIONS

Fluid Catalytic Cracking and Light Olefins Production, Hydrocarbon Publishing Company, 2011, http://www.hydrocarbonpublishing.com/store10/product.php?productid+b21104.

Zhang et al., Multifunctional two-stage riser fluid catalytic cracking process, Springer Applied Petrocchemical Research, Sep. 3, 2014.

Reid, William, Recent trends in fluid catalytic cracking patents, part V: reactor section, Dilworth IP, Sep. 3, 2014.

Akah et al., Maximizing propylene production via FCC technology, SpringerLink, Mar. 22, 2015.

Vogt et al., Fluid Catalytic Cracking: Recent Developments on the Grand Old Lady of Zeolite Catalysis, Royal Society of Chemistry, Sep. 18, 2015.

Zhou et al., Study on the Integration of Flue Gas Waste He Desulfuization and Dust Removal in Civilian Coalfired Heating Furnance, 2020 IOP Conf. Ser.: Earth Environ. Sci. 603 012018.

Vivek et al., Assessment of crude oil blends, refiner's assessment of the compatibility of opportunity crudes in blends aims to avoid the processing problems introduced by lower-quality feedstocks, www.digitalrefining.com/article/10000381, 2011.

International Standard, ISO 8217, Petroleum products—Fuels (class F)—Specifications of marine fuels, Sixth Edition, 2017.

International Standard, ISO 10307-1, Petroleum products—Total sediment in residual fuel oils—, Part 1: Determination by hot filtration, Second Edition, 2009.

International Standard, ISO 10307-2, Petroleum products—Total sediment in residual fuel oils—, Part 2: Determination using standard procedures for aging, Second Edition, 2009.

Ebner et al., Deactivatin and durability of the catalyst for Hotspot™ natural gas processing, OSTI, 2000, https://www.osti/gov/etdeweb/servlets/purl/20064378, (Year: 2000).

Morozov et al., Best Practices When Operating a Unit for Removing Hydrogen Sulfide from Residual Fuel Oil, Chemistry and Technology of Fuels and Oils, vol. 57, No. 4, Sep. 2001.

Calbry-Muzyka et al., Deep removal of sulfur and trace organic compounds from biogas to protect a catalytic methananation reactor, Chemical Engineering Joural 360, pp. 577-590, 2019.

Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.

Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.

Meng et al., In bed and downstream hot gas desulphurization during solid fuel gasification: A review, Fuel Processing Technology 91, pp. 964-981, 2010.

Okonkwo et al., Role of Amine Structure on Hydrogen Sulfide Capture from Dilute Gas Streams Using Solid Adsorbents, Energy Fuels, 32, pp. 6926-6933, 2018.

Okonkwo et al., Selective removal of hydrogen sulfide from simulated biogas streams using sterically hindered amine adsorbents, Chemical Engineering Journal 379, pp. 122-349, 2020.

Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.

Pashikanti et al., "Predictive modeling of large-scale integrated refinery reaction and fractionation systems from plant data. Part 3: Continuous Catalyst Regeneration (CCR) Reforming Process," Energy & Fuels 2011, 25, 5320-5344 (Year: 2011).

Lerh et al., Feature: IMO 2020 draws more participants into Singapore's bunkering pool., S&P Global Platts, www.spglobal.com, Sep. 3, 2019.

Cremer et al., Model Based Assessment of the Novel Use of Sour Water Stripper Vapor for NOx Control in CO Boilers, Industrial Combustion Symposium, American Flame Research Committee 2021, Nov. 19, 2021.

Frederick et al., Alternative Technology for Sour Water Stripping, University of Pennsylvania, Penn Libraries, Scholarly Commons, Apr. 20, 2018.

Da Vinci Laboratory Solutions B. V., DVLS Liquefied Gas Injector, Sampling and analysis of liquefied gases, https://www.davinci-ls.com/en/products/dvls-products/dvls-liquefied-gas-injector.

Wasson ECE Instrumentation, LPG Pressurization Station, https://wasson-ece.com/products/small-devices/ipg-pressurization-station.

Mechatest B. V., Gas & Liquefied Gas Sampling Systems, https://www.mechatest.com/products/gas-sampling-system/.

La Rivista dei Combustibili, The Fuel Magazine, vol. 66, File 2, 2012.

Zulkefi et al., Overview of H2S Removal Technologies from Biogas Production, International Journal of Applied Engineering Research ISSN 0973-4562, vol. 11, No. 20, pp. 10060-10066, © Research India Publications, 2016.

\* cited by examiner

INSULATION SECUREMENT SYSTEM AND ASSOCIATED METHODS

FIELD OF THE DISCLOSURE

The disclosure herein relates to systems and methods for insulating reactor and/or pressure vessels, such as catalytic reactors, and one or more embodiments of an apparatus and methods suitable for use in supporting and securing insulation materials to such vessels.

BACKGROUND

Reactor vessels and pressure vessels are used for various applications in research, development, and production. The size and shape of such vessels can vary widely, but certain features are consistent among most vessels. The outer shells of reactor and pressure vessels are typically welded at various positions during construction/formation of the vessels. For example, since reactor vessels are typically very large, various sections of material forming the outer shell must be individually welded together during construction of the vessel. The materials used for producing such outer shells (e.g., metals and alloys) often require post-weld heat treatment (PWHT) to relieve residual stress associated with the shell after welding. PWHT can serve to reduce stress associated with weldments down to acceptable levels approximating the adjacent base metal capabilities, but such treatment generally reduces the strength of the material at/around the site at which PWHT is applied.

Reactor vessels and pressure vessels may be insulated to ensure thermal continuity within the vessel (and throughout the contents of the vessel). As will be referenced further herein below, the weight associated with insulation materials can be substantial, particularly with respect to reactors of significant height. Common industry practice for installation of insulation materials on reactor vessels is to weld brackets or lugs to the vessel shell to support the vertical weight of the insulation materials when installed thereon. The welding of such brackets/lugs onto vessel shells is quite expensive (e.g., due to high energy costs and maintenance-related delays) as the entire reactor vessel must be subjected to an additional PWHT process following the welding. Such PWHT process relieves residual welding stress from the vessel prior to installing the insulation material and placing the reactor vessel into operation. Some alternative insulation methods use tightly banded straps around the vessel shell to hold layers of insulation in place mechanically via friction. Such friction methods for banding insulation to vessels without brackets typically do not hold up well over time. Therefore, even these friction methods commonly utilize brackets that are installed by welding as part of shop fabrication or installation in the field. In either event, further PWHT is generally necessary to relieve residual stress in the reactor vessel that is caused due to the welding treatment used to secure the brackets or lugs to the vessel shell, which support the insulation material. As noted above, PWHT commonly reduces the strength of the material at and around the treatment site. Further, PWHT can negatively impact vessels made of materials that are susceptible to cracking. For instance, potential detrimental effects of PWHT include reactor distortion, temper embrittlement, over-softening, reheat cracking, and the like.

Certain industry practices do not require PWHT; such approaches include using a friction banding method with multiple banded straps (e.g., such as ratchet tightening straps) positioned at different points vertically along the exterior of the reactor vessel that can be tightened to hold the insulation layers in place via friction. Example banding systems for use with insulation applications, as will be understood by those skilled in the art, are described in U.S. Pat. No. 9,068,582 to Wolbert et al. However, such a banding approach (without further securement, e.g., via welding) suffers from various drawbacks. For example, the life span of such insulation configurations is shorter than configurations employing welding and the banded straps are particularly susceptible to sagging over time as the reactor vessel circumferentially expands and contracts during use. Further, such configurations are less effective for sealing out moisture and protecting the insulation from deterioration due to exposure to moisture.

Therefore, it would be advantageous to develop methods and systems for insulating reactor/pressure vessels that minimize the amount of welding required to secure insulation, and thus reduce the amount of post-weld heat treatment.

SUMMARY OF THE DISCLOSURE

The disclosure herein provides one or more embodiments of systems and methods to secure insulation, e.g., on the vessel shell of a reactor vessel or pressure vessel. Such systems and methods advantageously do not rely on welding and thus can eliminate the need for PWHT of the vessel for insulation securement. These systems and methods can provide for extended lifespan of the vessel and can further offer resistance to deterioration of the insulation as a result of sagging, water penetration, and/or other external factors or contaminants.

In one aspect, the disclosure provides a vessel insulation system comprising a floating ring sized to circumscribe a top nozzle (e.g., a discharge nozzle) of a vessel (e.g., a reactor vessel or a pressure vessel), a plurality of straps connected to the floating ring, the plurality of straps extending downward from the floating ring and being positioned to run along a length of the outer shell of the vessel; a plurality of segmented rings positioned to circumscribe the outer shell of the vessel and connected to the plurality of straps, wherein the plurality of segmented rings is configured to support an insulation material circumscribing the outer shell of the vessel. In a further aspect, the disclosure provides a vessel insulation system, comprising: a floating ring circumscribing a top nozzle of a vessel; a plurality of straps connected to the floating ring that extend downward from the floating ring a length along an outer shell of the vessel; and a plurality of segmented rings for circumscribing the outer shell of the vessel and connected to the plurality of straps, wherein the plurality of segmented rings is configured to support an insulation material circumscribing the outer shell of the vessel. A further aspect of the disclosure provides an insulated vessel, comprising a vessel, an insulation material, and a vessel insulation system as described herein. In various embodiments provided herein, the vessel is a reactor vessel or a pressure vessel.

In some embodiments, the floating ring, the plurality of straps, and the plurality of segmented rings independently comprise a material selected from the group consisting of metals, metal alloys, or any combination thereof. In some embodiments, the floating ring, the plurality of straps, and the plurality of segmented rings comprise a stainless steel material. In some embodiments, the plurality of straps is substantially perpendicular to the plurality of segmented rings. In some embodiments, the floating ring, the plurality of straps, and the plurality of segmented rings have not been welded to the outer shell of the vessel. In some embodiments, the plurality of segmented rings is supported by the plurality of straps. In some embodiments, the insulation material is a plurality of insulation segments, each insulation segment being individually supported by a corresponding segment of the plurality of segmented rings. In some embodiments, each insulation segment is configured to be individually removable and/or replaceable, without disturbing any of the remaining insulation segments.

In some embodiments, the insulation material comprises a first layer of insulation, a second layer of insulation, and an outer jacket surrounding the first and second insulation layers. In some embodiments, the outer jacket comprises a corrugated metal jacketing material and a plurality of springs. In some embodiments, the vessel insulation system may further comprise a skirt portion positioned proximate a base portion of the vessel. In some embodiments, the skirt portion comprises a plurality of springs connected to the plurality of straps, and wherein the plurality of springs is configured to allow for vertical expansion of the vessel insulation system during operation of the vessel.

Some aspects of the disclosure provide methods of insulating vessels (e.g., reactor vessels or pressure vessels). For instance, such methods may comprise installing an embodiment of the vessel insulation system disclosed herein and installing one or more layers of an insulation material circumscribing an outer shell of the vessel. In some embodiments, the method of insulating a vessel may further comprise installing an outer jacket surrounding the one or more layers of insulation material. In some embodiments, the one or more layers of insulation material are installed in individual insulation segments. In some embodiments, each insulation segment is configured to be individually removable and/or replaceable, without disturbing any of the remaining insulation segments.

In some embodiments, a method of insulating a vessel without welding any insulation support structure to the vessel is disclosed. In such embodiments, for example, the method may comprise: (i) positioning a floating ring proximate to and circumscribing a top nozzle of a vessel, (ii) attaching a plurality of straps to the floating ring extending downward from the floating ring a length along an outer shell of the vessel, (iii) selectively positioning a plurality of segmented rings along the length of the outer shell, wherein the segmented rings are attached to and supported by the plurality of straps, and (iv) installing an insulation material that circumscribes the outer shell of the vessel, the insulation material being supported by the segmented rings. In some embodiments, the method may further comprise installing the insulation material in individual insulation segments. In some embodiments, none of the above method steps (i)-(iii) comprise welding any material to the outer shell of the vessel.

Other aspects of the disclosure are directed to a method of maintenance and repair of an insulated vessel. In one such embodiment, the method includes providing a vessel having an embodiment of the vessel insulation system disclosed herein and selectively removing and replacing individual insulation segments based on a pre-determined level of deterioration without disturbing any of the remaining insulation segments.

The disclosure thus includes, without limitation, the following embodiments:

A vessel insulation system, comprising: a floating ring sized to circumscribe a top nozzle of a vessel; a plurality of straps connected to the floating ring, the plurality of straps extending downward from the floating ring and being positioned to run along a length of the outer shell of the vessel; and a plurality of segmented rings positioned to circumscribe the outer shell of the vessel and connected to the plurality of straps, wherein the plurality of segmented rings is configured to support an insulation material circumscribing the outer shell of the vessel.

A vessel insulation system as disclosed above, wherein the floating ring, the plurality of straps, and the plurality of segmented rings each independently comprise a material selected from the group consisting of metals, metal alloys, or any combination thereof.

A vessel insulation system as disclosed above, wherein the floating ring, the plurality of straps, and the plurality of segmented rings each comprise a stainless steel material.

A vessel insulation system as disclosed above, wherein the plurality of straps is substantially perpendicular to the plurality of segmented rings.

A vessel insulation system as disclosed above, wherein the floating ring, the plurality of straps, and the plurality of segmented rings have not been welded to the outer shell of the vessel.

A vessel insulation system as disclosed above, wherein the plurality of segmented rings is supported by the plurality of straps.

An insulated vessel, comprising: a reactor vessel; an insulation material; and the reactor vessel insulation system as disclosed above.

An insulated vessel as disclosed above, wherein the insulation material is a plurality of insulation segments, each insulation segment being individually supported by a corresponding segment of the plurality of segmented rings.

An insulated vessel as disclosed above, wherein each insulation segment is configured to be individually removable and/or replaceable, without disturbing any of the remaining insulation segments.

An insulated vessel as disclosed above, wherein the insulation material comprises a first layer of insulation, a second layer of insulation, and an outer jacket surrounding the first and second insulation layers.

An insulated vessel as disclosed above, wherein the outer jacket comprises a corrugated metal jacketing material and a plurality of springs.

An insulated vessel as disclosed above, further comprising a skirt portion positioned proximate a base portion of the vessel.

An insulated vessel as disclosed above, wherein the skirt portion comprises a plurality of springs connected to the plurality of straps, and wherein the plurality of springs is configured to allow for vertical expansion of the vessel insulation system during operation.

A method of insulating a vessel, the method comprising: providing a vessel and the vessel insulation system as disclosed above; and installing one or more layers of an insulation material circumscribing an outer shell of the vessel.

A method of insulating a vessel as disclosed above, further comprising installing an outer jacket surrounding the one or more layers of insulation material.

A method of insulating a vessel as disclosed above, wherein the one or more layers of insulation material are installed in individual insulation segments.

A method of insulating a vessel as disclosed above, wherein each insulation segment is configured to be individually removable and/or replaceable, without disturbing any of the remaining insulation segments.

A method of insulating a vessel without welding any insulation support structure to the vessel, the method comprising: (i) positioning a floating ring proximate to and circumscribing a top nozzle of a vessel; (ii) attaching a plurality of straps to the floating ring extending downward from the floating ring a length along an outer shell of the vessel; (iii) selectively positioning a plurality of segmented rings along the length of the outer shell, wherein the segmented rings are attached to and supported by the plurality of straps; and (iv) installing an insulation material that circumscribes the outer shell of the vessel, the insulation material being supported by the segmented rings.

A method of insulating a vessel without welding to the vessel as disclosed above, further comprising installing the insulation material in individual insulation segments.

A method of insulating a vessel without welding to the vessel as disclosed above, wherein none of steps (i)-(iii) comprise welding any material to the outer shell of the vessel.

A method of maintenance and repair of an insulated vessel, the method comprising: providing an insulated vessel as disclosed above, and selectively removing and replacing individual insulation segments based on a pre-determined level of deterioration without disturbing any of the remaining insulation segments.

These and other features, aspects, and advantages of the disclosure will be apparent from a reading of the following detailed description together with the accompanying drawings, which are briefly described below. The disclosure includes any combination of two, three, four, or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE DRAWINGS

Figure 1:
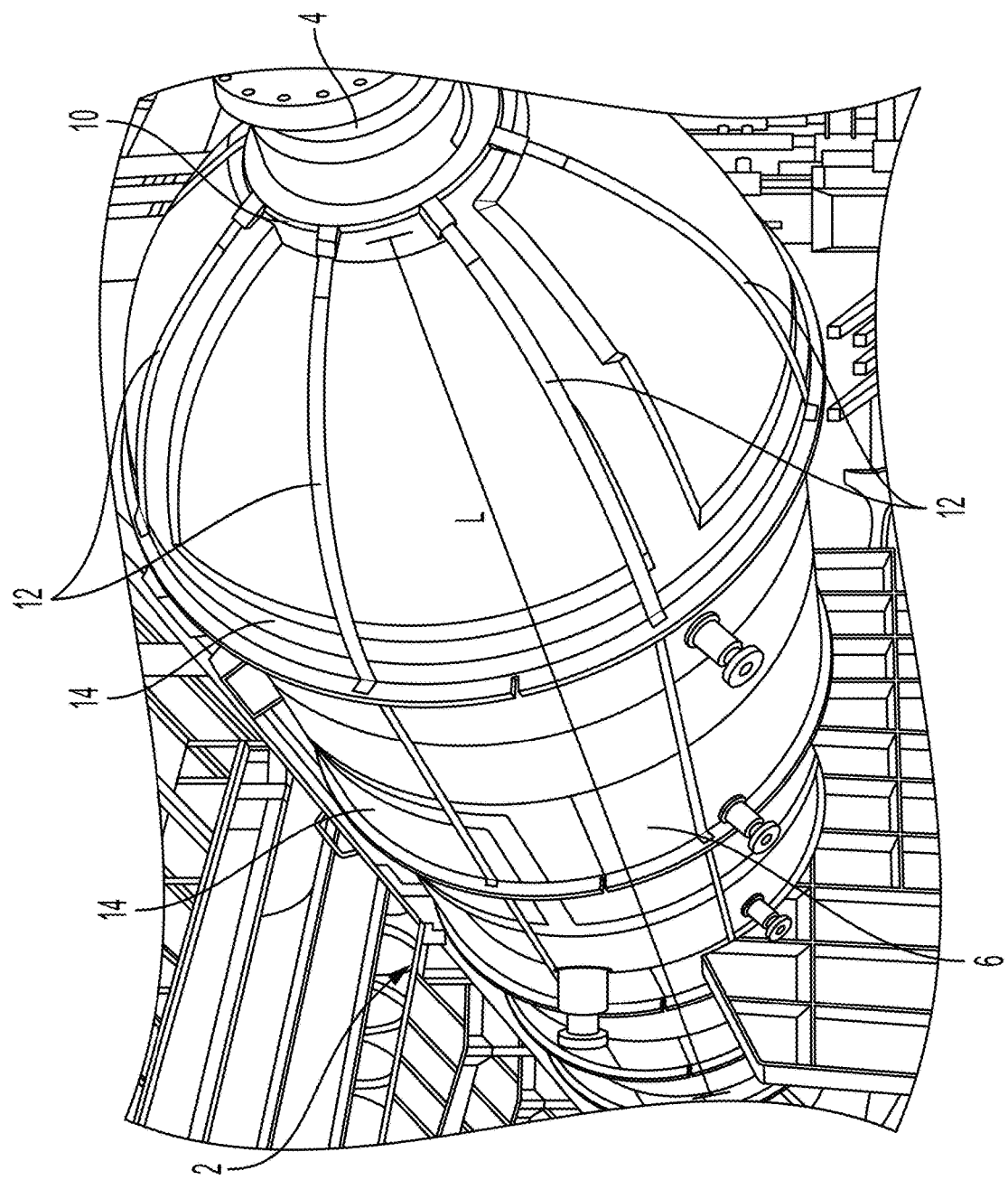
Figure 2:
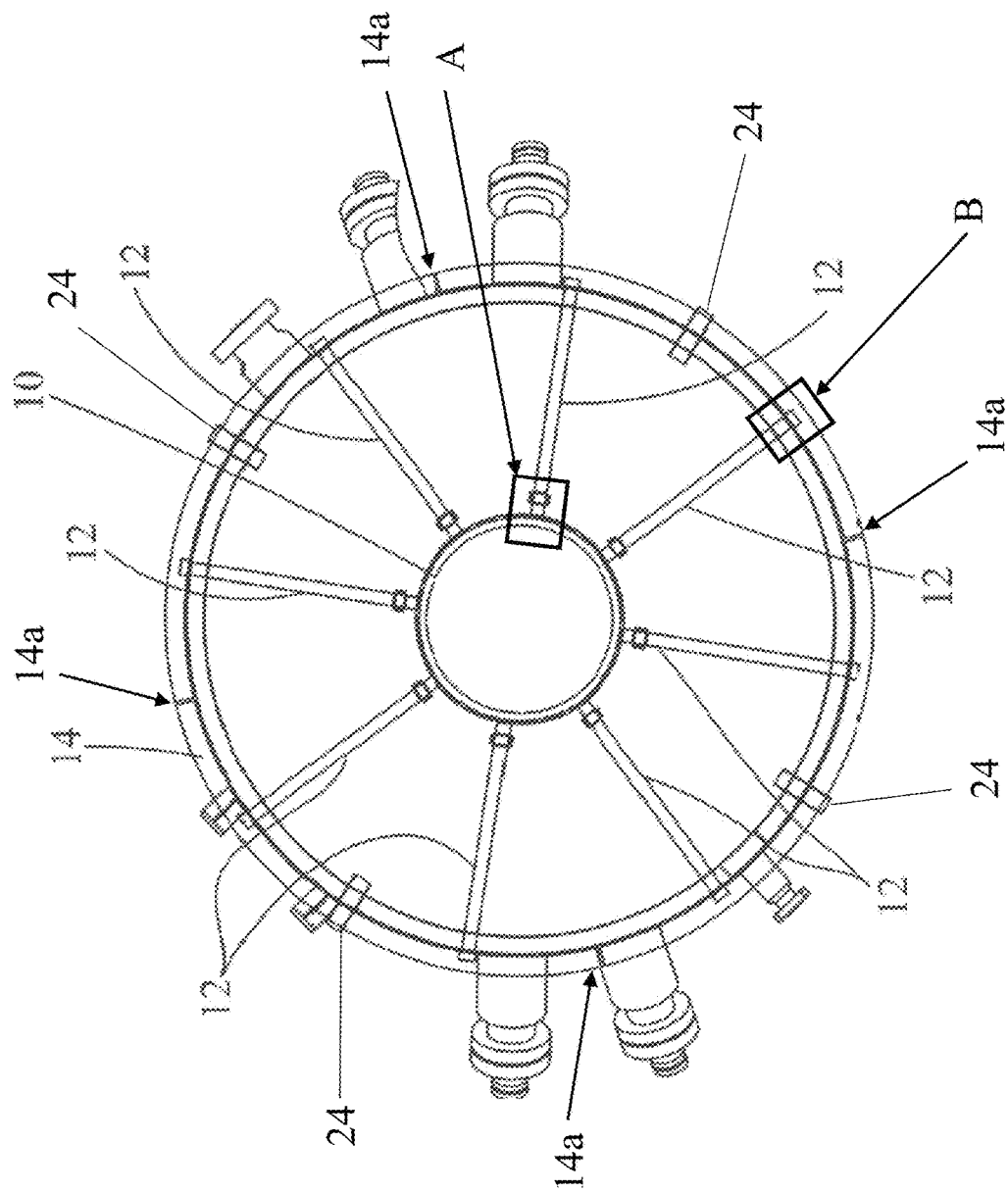
Figure 3:
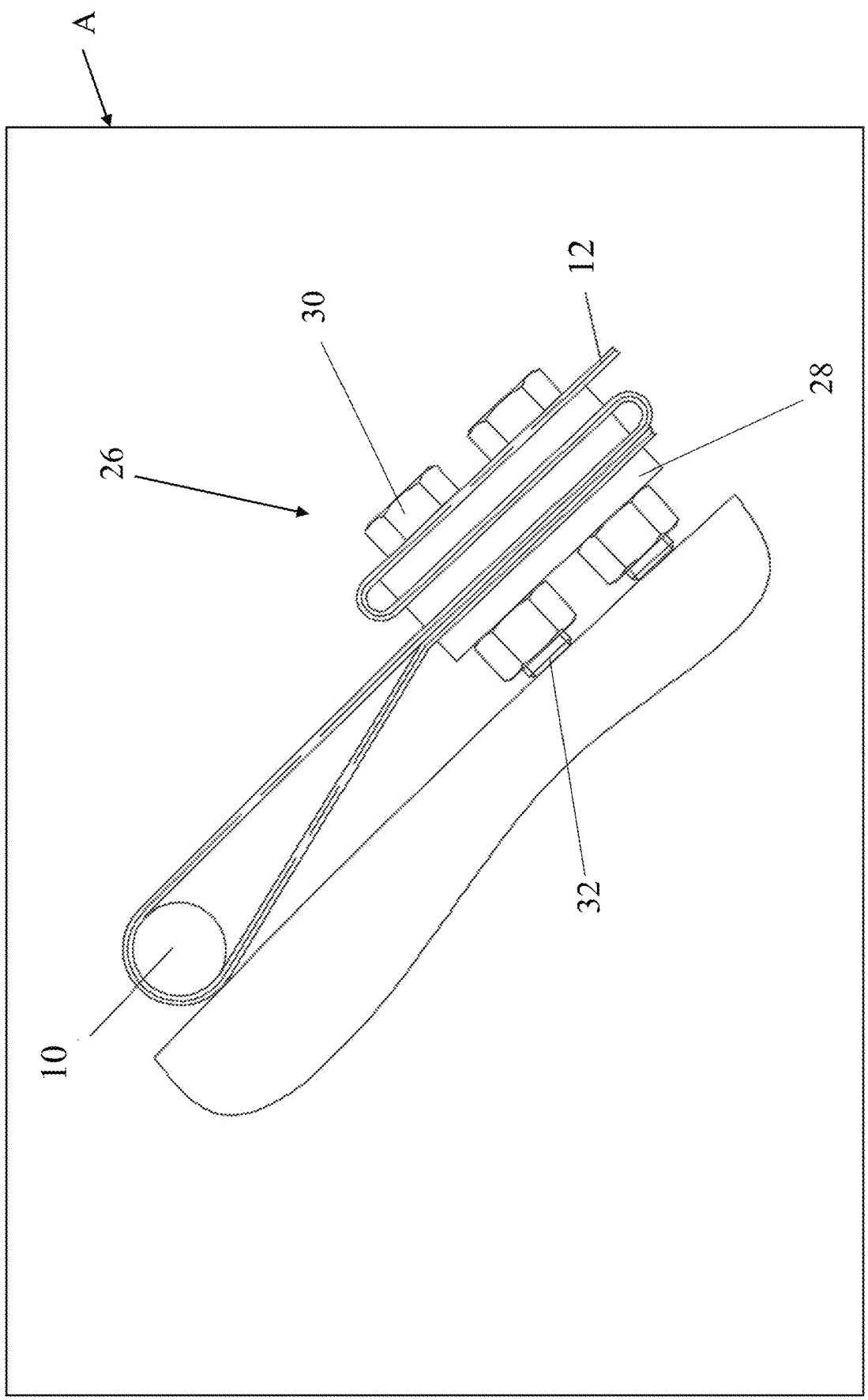
Figure 4:
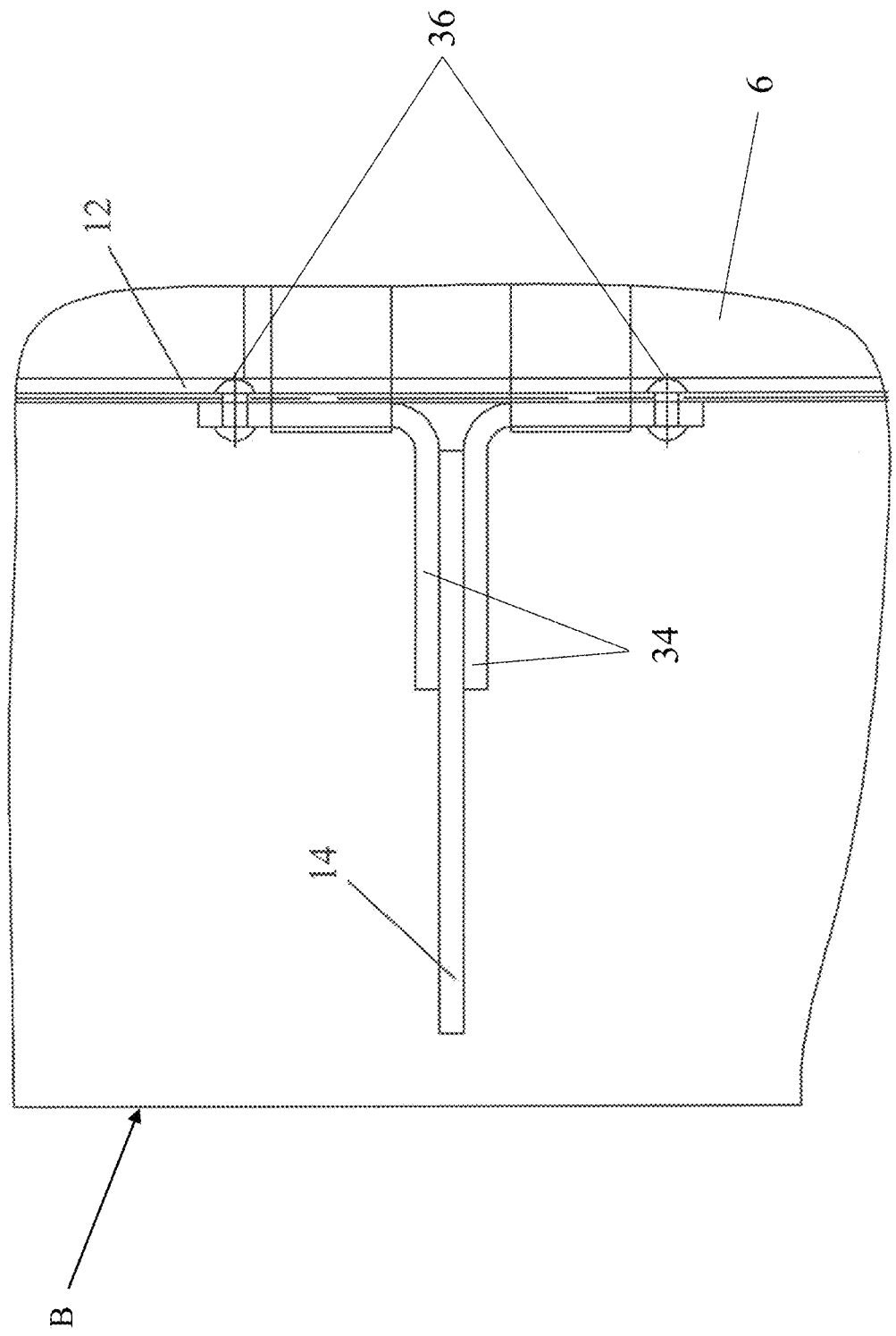
Figure 5:
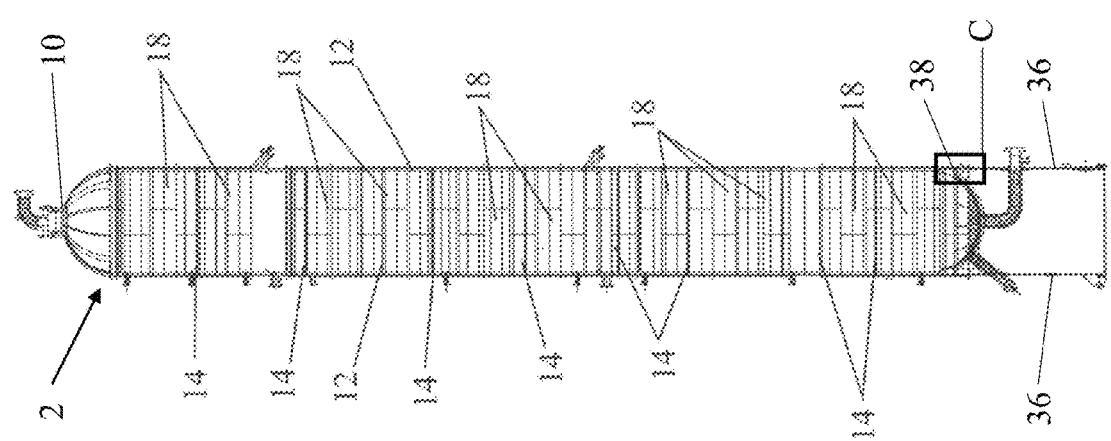
Figure 6:
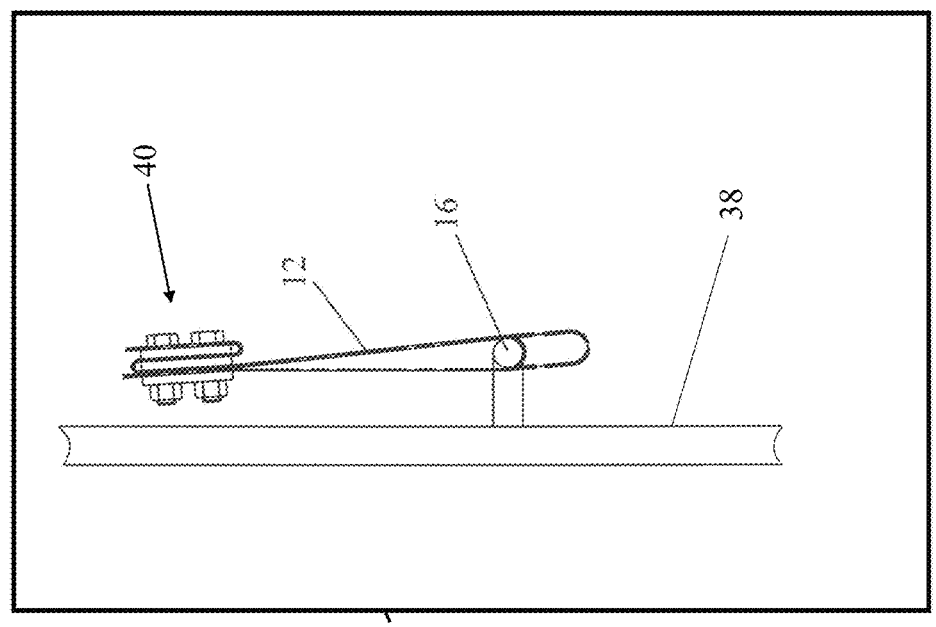
Figure 6:
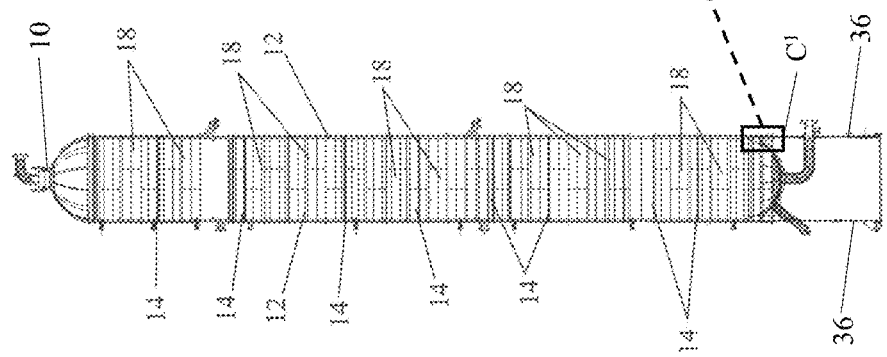
Figure 7:
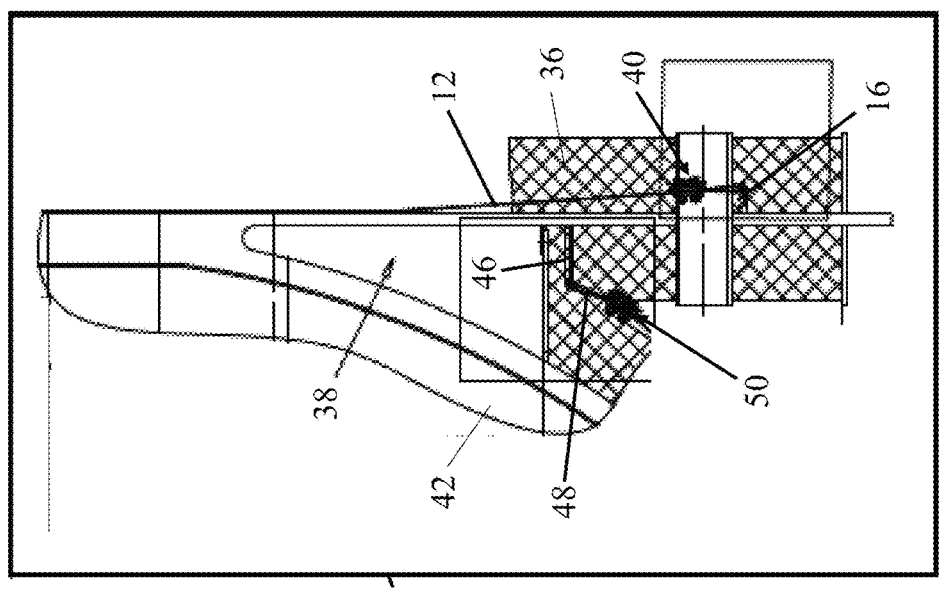
Figure 7:
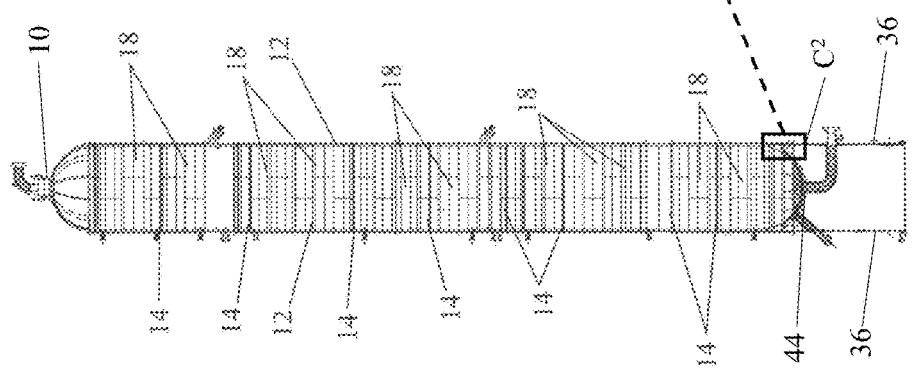
Figure 8:
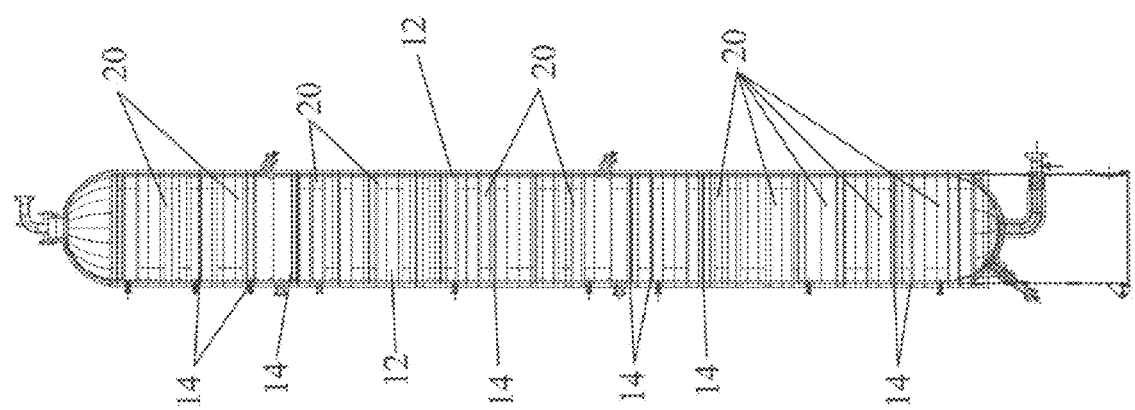
Figure 9:
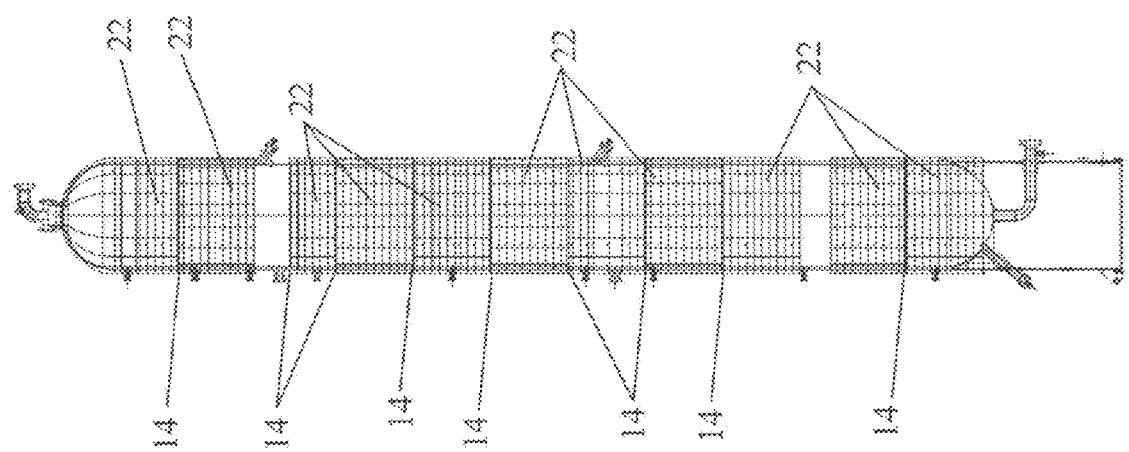
Figure 10:
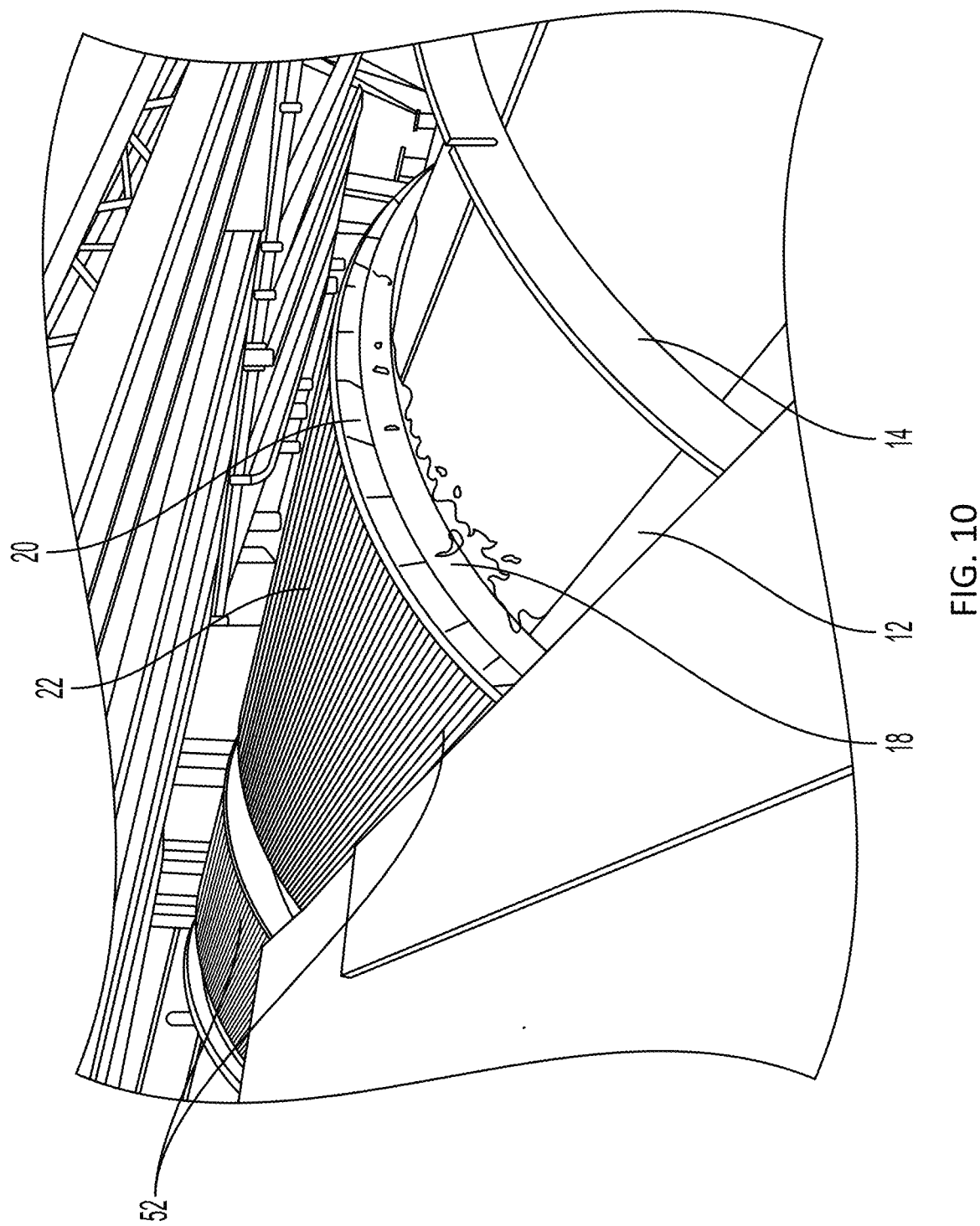
Figure 11:
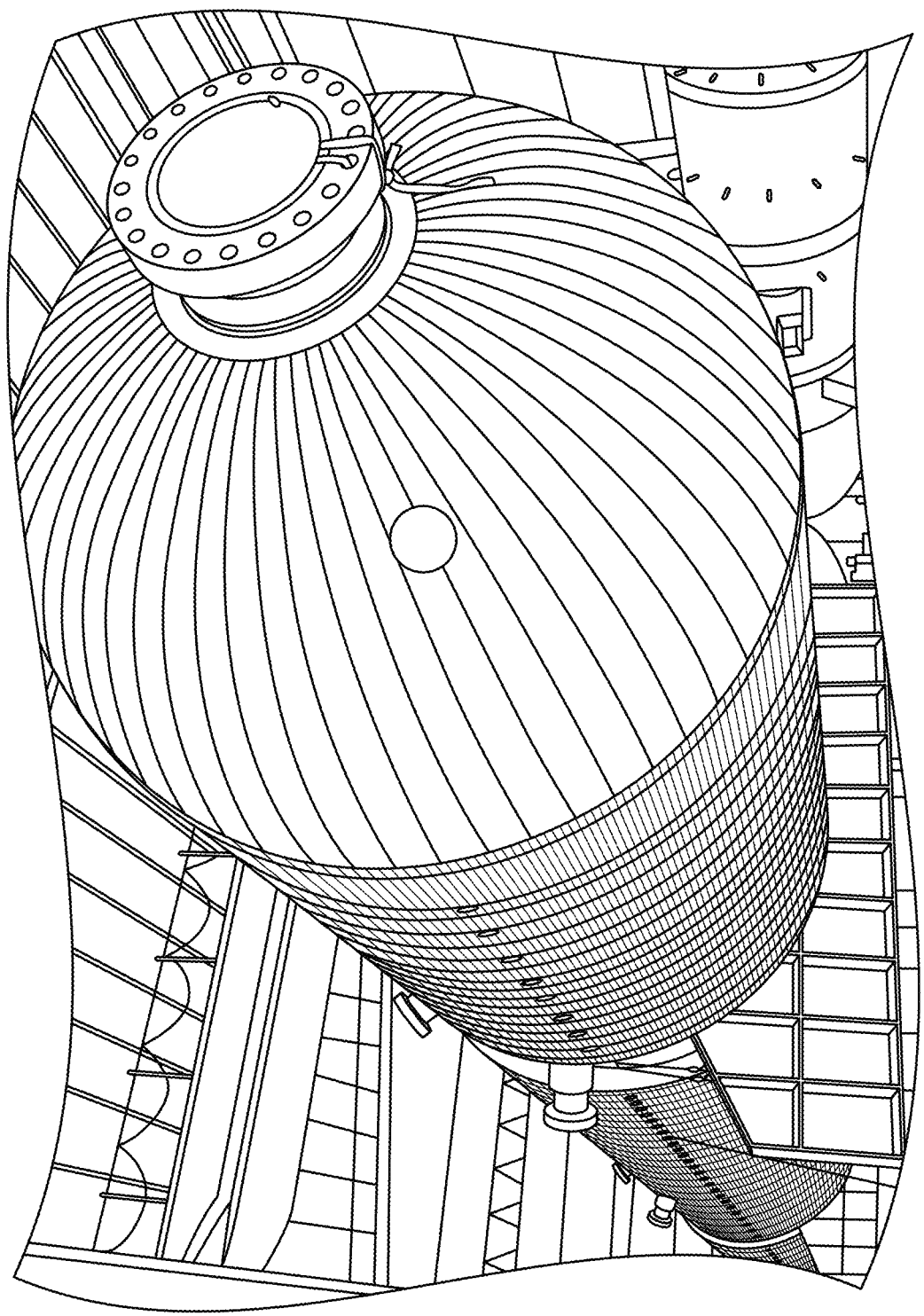

Having thus described the disclosure in general terms, reference will now be made to the accompanying drawings, which are not necessarily drawn to scale, and wherein:

FIG. 1 illustrates a perspective view of a horizontally-positioned reactor vessel having a reactor vessel insulation system comprising a floating ring circumscribing a top nozzle of the reactor vessel, a plurality of straps attached to the floating ring, and a plurality of segmented rings attached to the straps, installed thereon according to an embodiment of the disclosure;

FIG. 2 illustrates a two-dimensional view of the top of a reactor vessel having a reactor vessel insulation system installed thereon, according to an embodiment of the disclosure;

FIG. 3 shows a cut-away view of detail A as shown in FIG. 2, wherein detail A illustrates the physical connection between one of a plurality of straps and a floating ring, according to an embodiment of the disclosure;

FIG. 4 shows a cut-away view of detail B as shown in FIG. 2, wherein detail B illustrates the physical connection between one of a plurality of straps and one of a plurality of segmented rings, according to an embodiment of the disclosure;

FIG. 5 illustrates a reactor vessel insulation system that is fully installed on a vertical reactor vessel including a first layer of insulation material and a skirt portion attached to a base portion of the reactor vessel, according to an embodiment of the disclosure;

FIG. 6 shows a cut-away view of detail C as shown in FIG. 5, wherein detail C illustrates the physical connection between one of a plurality of straps and a flange attached to a base portion of the reactor vessel, according to an embodiment of the disclosure;

FIG. 7 shows a cut-away view of detail C in one or more embodiments where the reactor vessel insulation system further comprises a second floating ring positioned at the base portion of the reactor vessel, wherein detail C illustrates the physical connection between one of a second plurality of straps and a second flange attached to a base portion of the reactor vessel, according to an embodiment of the disclosure;

FIG. 8 illustrates a reactor vessel insulation assembly that is fully installed on a vertical reactor vessel including a second layer of insulation material, according to an embodiment of the disclosure;

FIG. 9 illustrates an outer jacket surrounding a first layer of insulation material and a second layer of insulation material, according to an embodiment of the disclosure;

FIG. 10 shows a close up cross-sectional view of a first layer of insulation material, a second layer of insulation material, and an outer jacket surrounding the first and second layers of insulation material being supported by a reactor vessel insulation system according to an embodiment of the disclosure; and FIG. 11 illustrates a perspective view of the horizontally-positioned reactor vessel and the reactor vessel insulation system as depicted in FIG. 1, wherein the reactor vessel and the reactor vessel insulation system have been completely encased by one or more layers of insulation material and an outer jacket, according to an embodiment of the disclosure.

DETAILED DESCRIPTION OF THE DISCLOSURE

The disclosure now will be described more fully hereinafter with reference to specific embodiments and particularly to the various drawings provided herewith. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a," "an," "the," include plural referents unless the context clearly dictates otherwise.

The disclosure provides materials and methods suitable for use in insulating vessels (e.g., including, but not limited to, pressurized vessels, reactor vessels, and catalytic reactor vessels). In particular, as will be provided in further detail herein below, the materials and methods relate to an insulation securement system (referred to herein also as an "insulation system" and/or a "reactor vessel insulation system") that does not require any welding to secure insulation to the shell of a vessel. Such an approach is advantageous, because minimizing the amount of welding to the exterior of a reactor vessel shell (and thus minimizing the subsequent PWHT applied thereto), can reduce potential damage to the outer shell of the vessel and provide efficiency and cost savings.

The types of catalytic reactors for which one or more embodiments of the disclosed insulation systems are relevant may vary and generally may include any type of vessels that are advantageously insulated. Various embodiments of the reactor vessel insulation systems according to the disclosure will be discussed herein in more detail regarding their specific application to gasoil hydrotreater (GOHT) catalytic reactor vessels, which is discussed by way of example only and is not meant to be construed as limiting with respect to the particular application of the disclosed embodiments of the systems and methods herein.

As is known in the art, vessels such as catalytic reactor vessels may be formed of various types of metals and/or metal alloys. For instance, traditional reactor vessels are commonly formed of carbon steel materials. Generally, these reactor vessels, as constructed, have been pre-treated to relieve stress imparted on the metal and/or metal alloy materials used in forming the reactor vessel. The sizes and shapes of vessels can vary widely, e.g., from small-scale, laboratory-based systems to very large, industrial vessels. In some embodiments, vessels for which the disclosed materials and methods are applicable can have heights, e.g., of at least about 100 feet, at least about 125 feet, at least about 150 feet, or at least about 175 feet.

Reactor vessels typically must be insulated in order to minimize heat loss and maintain thermal conductivity within the reactor vessel during use. The types of insulation materials used for this purpose can vary and typically include, but are not limited to, inorganic insulation materials (e.g., fibrous materials, such as mineral wool, glass wool, rock wool, and glass fiber felts; cellular materials, such as calcium silicate and cellular glass; and the like), organic insulation materials (e.g., petrochemical materials, such as expanded polystyrene (EPS), extruded polystyrene (XPS), polyurethane (PUR), phenolic foam, and polisocyanurate foam (PIR); renewable materials, such as cellulose, cork, wood fiber, hemp fiber, flax wool, sheep wool, and cotton insulation; and the like), and various other insulation materials (e.g., such as aerogels, vacuum panels, metallic foils, and/or reflective metallic insulation (RMI)). Such types of insulation materials may be used in various combinations, layers, and amounts as typically known in the art. For example, high temperature industrial insulation materials are commercially available from Aspen Aerogels, Inc.™ (see, e.g., Pyrogel HPS, Pyrogel XTE, and Pyrogel XTF insulation materials). According to the present disclosure, the types of insulation secured by the system provided herein are not particularly limited and include all materials that might be used for this purpose.

As depicted in FIG. 1, one embodiment of a vessel insulation system according to the disclosure comprises a floating ring 10 circumscribing a top nozzle 4 of a reactor vessel 2 and a plurality of straps 12 connected or attached to floating ring 10, which extend along a length L of an outer shell 6 of the reactor vessel 2. A plurality of segmented rings 14 circumscribe the outer shell 6 and connected or attached to the plurality of straps 12, wherein the plurality of segmented rings 14 is configured to support an insulation material circumscribing the outer shell 6 of the reactor vessel 2. It should be noted that the reactor vessel and the reactor vessel insulation system are depicted in a horizontal configuration as presented in FIG. 1; however, the reactor vessel, and likewise the reactor vessel insulation system, is typically in an upright, vertical configuration during use (e.g., as depicted in FIGS. 5-9 and as detailed further herein), such that the reactor vessel insulation system essentially hangs from the top of the reactor vessel via the floating ring (e.g., like a bird cage or an umbrella-type configuration) and substantially surrounds at least a portion of the outer shell of the reactor vessel.

A "floating ring" as used herein is a ring (typically constructed of metal, but not limited thereto), circumscribing a component at the top of the reactor, e.g., a discharge nozzle (as shown in FIG. 1). The floating ring may be in contact with the outer shell of the vessel, but it is not otherwise connected or attached to the outer surface of reactor vessel in any form other than via physical contact (e.g., it is not attached mechanically via welding, heat treating, clamping, etc.). Generally, the term "floating" as used in the industry can be used in reference to a floating ring bearing, a floating disc, and the like. Such terminology generally indicates that the ring material circumscribes some other component and may, or may not, necessarily come into physical contact with that other component. In vehicle applications using floating ring bearings, for example, a fluid barrier or pressurized air might come at least partially between the floating ring bearing and a cylindrical shaft such that at certain points, the floating ring bearing may contact the shaft, whereas at other points along the inner circumference of the floating ring bearing, the floating ring bearing may not contact the shaft. Likewise, it should be noted that a "floating ring" as used herein may or may not be in contact, fully or partially, with the outer shell of the reactor vessel at various times during operation of the reactor vessel. The floating ring may be constructed of a variety of different materials, for example, metals and/or alloys of metal. In some embodiments, the floating ring may be formed of a stainless steel material in particular. In some embodiments, for example, the floating ring may be formed of a stainless steel material such as S.S. TP 304. Relevant standards and specifications for such materials (and certain other materials referenced herein) are provided in ASTM A312 TP 304/ 304L (Standard Specifications for Stainless Steel Seamless Pipes and Tubes). The type and/or grade of stainless steel material may vary and such materials are commercially available from suppliers, such as, e.g., U.S. Metals, Inc.

A "plurality of straps" as used herein, refers to two or more elongated straps that are designed to extend along at least a portion of the length of the outer shell of the reactor vessel. In some embodiments, a plurality of straps may refer to at least 3 straps, at least 4 straps, at least 5 straps, at least 6 straps, at least 7 straps, at least 8 straps, or more. Generally, the length of the plurality of straps may be sized to extend at least a majority of the length of the reactor vessel (so as to extend a substantial portion of the length of the reactor, including embodiments wherein the straps extend the full length of the reactor, although not limited thereto). Typically, all straps are substantially the same length. The plurality of straps may be constructed of a variety of different materials, for example, metals and/or alloys of metal. In some embodiments, for example, the plurality of straps may be formed of a stainless steel material, e.g., such as SA 240 TP 304. Again, relevant standards and specifications for such materials are provided in ASTM A240 TP 304/304L (Standard Specifications for Stainless Steel Sheets and Plates). The type and/or grade of stainless steel material may vary and such materials are commercially available from suppliers, such as, e.g., U.S. Metals, Inc. The straps typically comprise the same material as one another, although the system is not limited thereto, and one strap may comprise a different material than another.

A "plurality of segmented rings" as used herein, refers to two or more rings (typically substantially circular rings) that are at least partially disconnected or detached at various points along the circumference of each ring, forming discrete segments in each ring. The discrete segments are connected or attached perpendicular or nearly perpendicular to the straps to form the segmented rings, which are circumferentially positioned around the vessel. Thus, the rings are typically positioned horizontally (with respect to the plurality of straps, which are described as being positioned "vertically"). Again, it is understood that such references are relevant to configurations wherein the vessel is upright, rather than on its side (as shown in FIG. 1). In some embodiments, the plurality of segmented rings may refer to at least 3 segmented rings, at least 4 segmented rings, at least 5 segmented rings, at least 6 segmented rings, at least 7 segmented rings, at least 8 segmented rings or more. In some embodiments, the number of discrete segments in each individual segmented ring may vary, for example, each segmented ring may comprise at least 2 discrete segments, at least 4 discrete segments, at least 6 discrete segments, at least 8 discrete segments, or more that are at least partially detached from each other, but that are connected or attached to the straps to form a segmented ring circumscribing the vessel. Generally, the diameter of the segmented rings may be sized appropriately based on the diameter of the reactor vessel. Typically, where the vessel has substantially the same diameter along its length, the segmented rings can have substantially the same diameter as one another (sufficient to circumscribe the exterior shell of the vessel). However, depending at least in part upon the construction/shape of the reactor and the longitudinal placement of the rings along the vessel, the diameters of the rings may vary from one another in order to accommodate the varying circumference of the vessel along its longitudinal axis. The plurality of segmented rings may be constructed of a variety of different materials, for example, metals and/or alloys of metal. In some embodiments, for example, the plurality of segmented rings may be formed of a stainless steel material, e.g., such as SA 516 GR.70N. Relevant standards and specifications for such materials are provided in ASTM A516 GR.70N (Standard Specifications for Steel Plates). The type and/or grade of stainless steel material may vary and such materials are commercially available from suppliers, such as, e.g., U.S. Metals, Inc. The rings typically comprise the same material as one another, although the system is not limited thereto, and one ring may comprise a different material than another in some embodiments as will be understood by those skilled in the art.

An insulation system as provided herein generally has at least two such segmented rings (as noted above) circumscribing the vessel, at various positions along the length thereof. Typically, it includes significantly more than two. In some embodiments, for example, the insulation system may comprise at least 4 segmented rings, at least 8 segmented rings, at least 12 segmented rings, at least 16 segmented rings, at least 20 segmented rings, at least 24 segmented rings, or more (e.g., such as about 4 to about 40 individual segmented rings, about 6 to about 20 individual segmented rings, or about 8 to about 12 individual segmented rings). Generally, the number of segmented rings provided in the insulation system may vary based on the particular height of the insulation vessel (e.g., the taller the vessel, the more segmented rings generally required) and the operating temperature of the vessel (e.g., the higher the temperature of the vessel, the more segmented rings generally required, e.g., in order to maintain outer jacketing screws in place). The number of segmented rings provided in the insulation system may further vary based on the weight of the particular type of insulation material being used, the standard size of the insulation material being installed thereon, the number of exterior components on the reactor vessel requiring clearance (e.g., exterior valves and/or piping that cannot be covered or completely encased by the insulation materials), and combinations thereof. In general, the overall configuration of the segmented rings positioned along the longitudinal axis or length of the reactor vessel (e.g., including the number and the characteristics thereof) can be adjusted to accommodate any size or type of reactor vessel and/or to support any size or type of insulation material connected or attached thereto, such as those described herein above. In some embodiments, the number of segmented rings may be adjusted to allow for a maximum level of expansion of the vessel so as to allow for expansion and/or contraction of the vessel. For example, in some embodiments, the number of segmented rings is configured to allow for a maximum level of expansion of less than about 0.5 inches over a 15-ft span, less than about 0.35 inches over a 15-ft span, or less than about 0.25 inches over a 15-ft span. Where the system comprises an outer jacket (as will be described in further detail herein below), the number of segmented rings can, in some embodiments, be selected such that screws in the outer jacket will not be pulled apart with expansion associated with temperature cycles.

In some embodiments, for example, the number of segmented rings positioned circumferentially about the vessel along its longitudinal axis may be affected by the specific load capacity of each individual segmented ring and/or the load capacity of each individual segment within those segmented rings. In some embodiments, one or more dimensions (e.g., such as the width) of the segmented rings may be altered so as to increase the load capacity of those rings. Typically, each of the segmented rings have substantially the same dimensions and/or substantially the same load capacity. However, such a configuration is not meant to be limiting and generally any and/or all of the individual segmented rings may have different dimensions and/or load capacities. In some embodiments, each individual segmented ring may be configured to support at least 100 lbs of insulation material, at least 1,000 lbs of insulation material, at least 10,000 lbs of insulation material, or more weight of insulation material. In some embodiments, the plurality of segmented rings may be evenly or non-evenly spaced circumferentially along the longitudinal axis or length of the reactor vessel. In some embodiments, the plurality of segmented rings may be closely spaced apart, for example, such that none of the individual rings are more than 20 feet apart, more than 15 feet apart, more than 10 feet apart, or more than 5 feet apart. In other words, the plurality of segmented rings may be closely spaced apart from each other such that each ring is less than 5 feet apart, less than 10 feet apart, less than 15 feet apart or even less than 20 feet apart. In some embodiments, the plurality of segmented rings may be widely spaced apart, for example, such that substantially all of the individual rings are spaced at least 20 feet apart, at least 25 feet apart, at least 30 feet apart, at least 35 feet apart, or at least 40 feet apart.

FIG. 2 depicts a two-dimensional view looking down from above at the top of the reactor vessel equipped with an insulation system according to an embodiment of the disclosure. In the embodiment depicted in FIG. 2, the floating ring 10 is connected or attached to the plurality of straps 12 as highlighted by detail A (which will be described in more detail in relation to FIG. 3) and the plurality of straps 12 is connected or attached to the plurality of segmented rings 14 as highlighted by detail B (which will be described in more detail in relation to FIG. 4). As noted above, each segmented ring may comprise any number of discrete segments therein that are at least partially detached from each other. For example, the detachment and/or disconnection point 14a of these discrete segments, either fully or partially, is depicted in FIG. 2. In some embodiments, the segmented rings may comprise one or more intermediate supports 24 connected or attached to the segmented rings 14 that provide, e.g., added strength and/or durability to the segmented rings. The number and/or positioning of these intermediate supports 24 may be varied, for example, based on the size of the reactor vessel, the type of insulation being used, and the like.

As noted above, the plurality of straps is generally physically connected or attached to the floating ring. The mechanism for connecting or attaching the plurality of straps may vary and generally may include any mechanism configured to maintain a secure connection or attachment between the floating ring and the plurality of straps before and during use of the reactor vessel. For example, FIG. 3 illustrates the physical connection or attachment of the plurality of straps and the floating ring according to an example embodiment of the present disclosure. As shown in FIG. 3, one of the plurality of straps 12 may be connected or attached to the floating ring 10 (a cross-sectional view of the floating ring 10 is depicted in FIG. 3) via a clamping mechanism 26. In some embodiments, the clamping mechanism 26 may comprise one or more clamping plates 28 that can be tightened by nut 30 and bolt 32 configurations. In some embodiments, the straps 12 may be doubled-over and/or folded within the clamping plates 28 prior to tightening in order to ensure a secure and permanent connection or attachment between the plurality of straps 12 and the floating ring 10, suitable for supporting the segmented rings (not shown) that are connected or attached thereto.

As noted above, the plurality of segmented rings 14 may be connected or attached to, and supported by the plurality of straps 12 at varying positions along the length of the straps 12. Generally, the plurality of straps 12 may be substantially parallel to the outer shell of the reactor vessel (e.g., such that the straps hang substantially flush to the outer shell of the vessel) and substantially perpendicular to the plurality of segmented rings 14 (e.g., forming an approximate 90° angle with the segmented rings). In some embodiments, the "plurality of straps" may be referred to herein as being "vertical" in nature and the "plurality of segmented rings" may be referred to herein as being "horizontal" in nature (although it is to be understood that when the reactor is on its side, such terms are not to be indicative of overall configuration and, rather, are used largely in reference to the direction of the longitudinal axis or length of the reactor, e.g., "vertical" generally refers to the direction along the length of the outer shell of the vessel, which is typically vertical while in use).

The mechanism for connecting or attaching the plurality of segmented rings to the plurality of straps may vary and generally may include any mechanism configured to maintain a secure connection or attachment between the plurality of straps and the plurality of segmented rings. For example, FIG. 4 illustrates the physical connection or attachment of the plurality of straps and the plurality of segmented rings according to one embodiment of the disclosure. As shown in FIG. 4, one of the plurality of segmented rings 14 (a cross-sectional view of one of the segmented rings is depicted in FIG. 4) may be attached to one of the plurality of straps 12 (which are substantially parallel to the outer shell 6 and substantially perpendicular to the segmented rings 14) via at least two curved metal plates 34 and at least one rivet 36 per plate. While the plurality of straps and the plurality of segmented rings are shown as being substantially perpendicular in the depicted embodiments, it should be noted that such a configuration is not required. For example, in some embodiments one or more of the segmented rings and the plurality of straps may form an angle that is less than about 90° or greater than about 90°. In some embodiments, the plurality of segmented rings may be connected or attached to the plurality of straps via various methods (e.g., such as welding, that does not contact the outer shell of the reactor vessel, or some alternative clamping mechanism) so long as the connection or attachment therebetween is sufficient to connect the rings and straps and support the weight of the insulation material.

FIG. 5 illustrates a reactor vessel insulation system according to an embodiment of the disclosure (e.g., including a floating ring 10, a plurality of straps 12, and a plurality of segmented rings 14) that has been installed on a reactor vessel 2 including a first layer of insulation material 18 and a skirt portion 36 attached to a base 38 of the reactor vessel 2. The skirt portion 36 (where present) may comprise various materials, e.g., such as a metal, metal alloy, and the like. In some embodiments, the skirt portion may comprise the same material as the reactor vessel and/or may comprise one or more different materials. In some embodiments, the skirt portion may be attached to the base 38 of the reactor vessel 2 such that the bottom head of the reactor vessel is covered by the skirt portion. One such embodiment is highlighted by detail C in FIG. 5. As depicted in FIG. 5, the reactor vessel is generally oriented in a vertical configuration once installed and operating and thus, in some embodiments, the skirt portion may be substantially perpendicular to the ground so as to provide a stable base for securing the reactor vessel in place. In some embodiments, for example, the skirt portion may be substantially cylindrical in shape; however, the shape of the skirt portion is not limited thereto. Generally, any type of skirt portion commonly used in the art may be suitable for use as described herein above. In some embodiments, the skirt portion may provide a support function for the reactor vessel and/or may be connected to or may surround a separate base support structure configured to provide foundational support to the reactor vessel. In some embodiments, the skirt portion 36 may comprise a plurality of springs (not pictured) connected to the plurality of straps 12 of the reactor vessel insulation system. In such embodiments, the springs may allow the reactor vessel insulation system to expand and/or contract as necessary during operation of the reactor vessel, e.g., allowing for the expansion and/or contraction of the reactor vessel during operation.

FIG. 6 shows a cut-away view of detail C as shown in FIG. 5, according to another embodiment of the present disclosure (labeled C'), wherein detail C' illustrates a physical connection between one of the plurality of straps 12 and a flange 16 attached to the base portion 38 of the reactor vessel. In some embodiments, the plurality of straps 12 may be connected to the flange 16 via a clamping mechanism 40, for example, which may be the same type of clamping mechanism as described herein above with regard to the connection or attachment between the plurality of straps 12 and the floating ring 10 (see, e.g., FIG. 3). In some embodiments, a plurality of springs (not pictured) may be disposed between one of the plurality of straps 12 and the flange 16 to allow the vessel insulation system to expand and/or contract as necessary during operation of the vessel. In some embodiments, a skirt portion 36 may be connected or attached between the base 38 of the vessel and the ground, as noted above. It should be noted that the mechanism for connecting or attaching the plurality of straps to the base portion of the reactor may vary and generally may include any mechanism configured to maintain a secure connection or attachment between the flange and the plurality of straps during operation of the reactor vessel.

In some embodiments, reactor vessel insulation systems of the disclosure may comprise a second floating ring positioned proximate to a bottom head (e.g., commonly a hemispherical head) 42 of the reactor vessel and circumscribing a bottom component (e.g., a bottom nozzle 44) of the reactor vessel. In such embodiments, it should be noted that the second floating ring generally functions in a similar manner as floating ring 10 described herein above, with respect to FIG. 2 (e.g., comprising a second floating ring, a second plurality of straps, and at least one segmented ring), with exception to the fact that the second plurality of straps do not extend upward along the length of the outer shell of the reactor vessel but instead are only present on the bottom hemispherical head 42 of the reactor vessel. Generally, such a configuration provides support for one or more insulation materials installed proximate to the bottom head 42 of the reactor vessel. FIG. 7 shows a cut-away view, labelled $C^2$, according to another embodiment where the reactor vessel insulation system further comprises a second floating ring (not pictured) positioned proximate to the bottom hemispherical head 42 of the reactor vessel and circumscribing a bottom nozzle 44 of the reactor vessel. In the embodiment depicted in FIG. 7, cut-away view labeled $C^2$ illustrates the bottom connection of the plurality of straps 12, the connection of one of the second plurality of straps 48, and part of the skirt portion 36 attached to the base portion 38 of the reactor vessel. FIG. 7 depicts the physical connection between one of the plurality of straps 12 and the flange 16 (e.g., via clamping mechanism 40), the flange 16 being connected or attached to the base portion 38 of the reactor vessel, and the physical connection between one of a second plurality of straps 48 and a second flange 46 (e.g., via clamping mechanism 50) the second flange 46 being connected or attached to the base portion 38 of the reactor vessel. It should be noted that, in the depicted embodiment, the strap labeled 48 represents just one of a second plurality of straps 48 that connect or attach to the second floating ring circumscribing the bottom nozzle 44.

FIG. 8 illustrates a reactor vessel insulation system according to an embodiment of the disclosure (e.g., including a floating ring 10, a plurality of straps 12, and a plurality of segmented rings 14) that has been installed on a reactor vessel including a first layer of insulation material (not pictured) and a second layer of insulation material 20 surrounding the first layer of insulation material and circumscribing the reactor vessel. Generally, the types of insulation material used may be varied as desired and any insulation material as discussed herein above may be suitable for use in such embodiments. In some embodiments, the reactor vessel insulation system may include an outer jacket 22 (as depicted in FIG. 9), wherein the outer jacket 22 surrounds the first layer of insulation material 18 and the second layer of insulation material 20.

An "outer jacket" as used herein, refers to an outer covering that is wrapped around one or more insulation layers thereby surrounding the one or more insulation layers and circumscribing the reactor vessel to shield the insulation from external forces (e.g., moisture, wear, and mechanical damage). In some embodiments, the outer jacket may comprise a corrugated metal jacketing material and a plurality of springs. In some embodiments, the outer jacket may comprise a corrugated metal material, e.g., such as aluminum, stainless steel, zinc galvanized steel, polyvinyl chloride (PVC), fiberglass cloth and/or fabric materials, combinations thereof, and the like. Generally, the types of material used for the outer jacket may vary and may be selected based on mechanical, chemical, thermal, and/or moisture properties as well as based on the cost and desired aesthetics for the installation. In some embodiments, the outer jacket may comprise a plurality of springs (in addition to a metal "jacket" material). The plurality of springs may be characterized as compression and/or expansion springs, which allow for compression and/or expansion of the reactor vessel, the reactor vessel insulation system, and/or the one or more layers of insulation during operation of the reactor vessel. Such springs are generally constructed of metal.

In some embodiments, the insulation material (e.g., including the first layer of insulation material 18 and the second layer of insulation material 20) and/or the outer jacket 20 may comprise a plurality of insulation segments 48, each insulation segment being individually supported by a corresponding segment of the plurality of segmented rings 14. FIG. 10 depicts a close up cross-sectional view of a first layer of insulation material 18, a second layer of insulation material 20, and an outer jacket 22 surrounding the first and second layers of insulation material, each being supported by one of the plurality of segmented rings 14 of the reactor vessel insulation system. Generally, as noted herein above, the weight of the plurality of segmented rings is supported by the plurality of straps attached to the floating ring and the weight of the insulation materials and the outer jacket is supported by the plurality of segmented rings. It should be noted that the number of individual insulation segments 52 may vary based on the type of insulation used, the type of outer jacket, the number of vertical straps, the number of segmented horizontal rings, the number of segments in each horizontal ring, the number of outlet and/or inlet valves on the exterior of the reactor vessel, the size of the reactor vessel, and various other parameters. In some embodiments, for example, the number of individual insulation segments may be at least 4 individual segments, at least 8 individual segments, at least 16 individual segments, at least 32 individual segments, or more (e.g., about 4 to about 50 individual segments, such as about 8 to about 32 individual segments).

In general, it should be noted that the individual insulation segments 52 may be defined by the area between two of the plurality of straps 12 (e.g., which are adjacent to one another) and two of the plurality of segmented rings 14 (e.g., which are adjacent to one another), so as to form a four-sided rectangular shape in embodiments wherein the "vertical" straps and the "horizontal" rings are substantially perpendicular to one another). Such a configuration is not intended to be limiting, and in some embodiments, the individual insulation segments may be defined by one or more other shapes and/or may be irregularly shaped and/or may not be sized in accordance with the embodiments above. In some embodiments, each individual insulation segment may be independently, sized or shaped, based on the specifications of the reactor vessel.

The plurality of insulation segments 52 may advantageously be installed individually (e.g., one segment at a time) to allow for an easier, piece-by-piece installation process. In some embodiments, each insulation segment may be configured to be individually removable and/or replaceable for the purposes of maintenance and repair of the reactor vessel and/or maintenance and repair of the insulation material. In such embodiments, each insulation segment may advantageously be removed and repaired, without disturbing any of the remaining insulation segments. Generally, this ability to remove and repair individual insulation segments is a significant advantage over traditional insulation securement systems, because it can provide increased maintenance efficiency and cost reduction. Such cost reduction may be achieved by maintaining the integrity of the insulation material and the outer jacket material over time, for example, by replacing the typical wear and tear of such materials.

FIG. 11 illustrates a perspective view of the horizontally-positioned reactor vessel and the reactor vessel insulation system of the embodiment as depicted in FIG. 1 in a fully assembled configuration prior to transportation of the reactor vessel insulation system to the operation site. As shown, the reactor vessel and the reactor vessel insulation system have been completely encased by one or more layers of insulation material and an outer jacket.

The disclosure, in addition to providing insulation securement systems and reactor vessels insulated via such systems, provides corresponding methods of insulating a reactor vessel. In some embodiments, a method of insulating a vessel includes installing a reactor vessel insulation system according to an embodiment of the disclosure, and installing one or more layers of an insulation material circumscribing an outer shell of the reactor vessel. In some embodiments, the disclosure provides a method that includes providing a reactor vessel, associating a reactor vessel insulation system therewith, and installing one or more layers of an insulation material circumscribing an outer shell of the reactor vessel. In some embodiments, the method may further include installing an outer jacket surrounding the one or more layers of insulation material, e.g., an outer jacket as described herein above. As noted above, the one or more layers of insulation material and/or the outer jacket may be installed in individual insulation segments. In such embodiments, the methods disclosed herein provide that each insulation segment can be configured to be individually removable and/or replaceable, without disturbing any of the remaining insulation segments.

Advantageously, the disclosed systems and methods can provide, in some embodiments, for insulating a reactor vessel without welding any insulation support structure to the reactor vessel, e.g., such that post-weld heat treatment of the reactor vessel (following any PWHT associated with construction of the outer shell of the vessel itself) is not required. "Insulation support structure" as used herein refers to any structure, or component of that structure, used to support the weight of one or more insulation materials installed on a reactor vessel as described herein (e.g., such as a vessel insulation system as described herein, or any component thereof, including, but not limited to a floating ring, a plurality of straps, a plurality of segmented rings, a skirt portion, and the like). In one or more embodiments, such methods include positioning a floating ring on or near a top component of the vessel (e.g., proximate to and circumscribing a top nozzle of the vessel); attaching a plurality of straps to the floating ring extending downward from the floating ring a length along an outer shell of the vessel; selectively positioning a plurality of segmented rings along the length of the outer shell of vessel, wherein the segmented rings are attached to and supported by the plurality of straps; and installing an insulation material that circumscribes the outer shell of the vessel, the insulation material being supported by the segmented rings. In some embodiments, the method may further include installing the insulation material in individual insulation segments. Although the method for installing insulation and the securement system are described as sequential, the method steps can be conducted in varying order. Thus, in some embodiments, the plurality of straps can be attached to the floating ring prior to the positioning of the floating ring around the top nozzle. In some embodiments, one or more of the plurality of segmented rings may be connected or attached to the plurality of straps prior to connecting or attaching the plurality of straps to the floating ring.

As noted above, typical methods for insulating reactor vessel typically require post-weld heat treatment of the reactor vessel because support brackets commonly used must be welded to the exterior of the reactor vessel in order to support the weight of the insulation materials installed thereon. Such typical methods are generally not cost effective and can damage the integrity of the reactor vessel due to the amount of additional stress applied to the reactor vessel. By contrast, the insulation methods provided according to the disclosure herein alleviate this post-weld heat treatment process. Thus, in some embodiments, none of the above method steps include welding any material to the outer shell of the vessel. Instead, as noted above, the floating ring and the plurality of straps support the plurality of segmented rings forming the reactor vessel insulation system, and generally the weight of the insulation materials and the outer jacket are entirely supported by the reactor vessel insulation system provided herein.

Some aspects of the disclosure relate specifically to a method of maintenance and repair of an insulated reactor vessel. In one or more embodiments, a method of maintaining and repairing an insulate vessel includes providing a reactor vessel and a reactor vessel insulation system according to an embodiment of the disclosure, and selectively removing and replacing individual insulation segments based on a pre-determined level of deterioration and without disturbing any of the remaining insulation segments. The pre-determined level of deterioration may be based at least in part on an amount of deterioration that is expected before the next turnaround or maintenance period for the vessel.

Having the benefit of the teachings presented in the foregoing descriptions, many modifications and other embodiments of the disclosure set forth herein will come to mind to those skilled in the art to which these disclosures pertain. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A vessel insulation system, the system comprising:
a floating ring sized to circumscribe a top nozzle of a vessel;
a plurality of straps connected to the floating ring, the plurality of straps extending downward from the floating ring and positioned to run along a length of the outer shell of the vessel; and
a plurality of segmented rings connected to the plurality of straps and positioned to circumscribe the outer shell of the vessel, each of the plurality of segmented rings having a ledge configured to vertically support an insulation material when circumscribing the outer shell of the vessel.

2. The vessel insulation system of claim 1, wherein the floating ring, the plurality of straps, and the plurality of segmented rings each independently comprises a material selected from the group consisting of metals, metal alloys, or any combination thereof.

3. The vessel insulation system of claim 1, wherein the floating ring, the plurality of straps, and the plurality of segmented rings each comprises a stainless steel material.

4. The vessel insulation system of claim 1, wherein the plurality of straps is positioned substantially perpendicular to the ledge of the plurality of segmented rings.

5. The vessel insulation system of claim 1, wherein the floating ring, the plurality of straps, and the plurality of segmented rings have not been welded to the outer shell of the vessel.

6. The vessel insulation system of claim 1, wherein the plurality of segmented rings is supported by the plurality of straps.

7. An insulated vessel comprising:
a vessel;
a vessel insulation system comprising:
   a floating ring sized to circumscribe a top nozzle of the vessel,
   a plurality of straps connected to the floating ring, the plurality of straps extending from the floating ring and positioned to run along a length of the outer shell of the vessel, and
   a plurality of segmented rings connected to the plurality of straps and positioned to circumscribe the outer shell of the vessel, each of the plurality of segmented rings having a ledge circumscribing the outer shell of the vessel; and
an insulation material comprising a plurality of insulation segments, each insulation segment individually and vertically supported by the ledge of a corresponding segment of the plurality of segmented rings.

8. The insulated vessel of claim 7, wherein each insulation segment is configured to be individually removable or replaceable, without disturbing any remaining insulation segments when being removed or replaced.

9. The insulated vessel of claim 7, wherein the insulation material comprises a first layer of insulation, a second layer of insulation, and an outer jacket surrounding the first and second layers of insulation.

10. The insulated vessel of claim 9, wherein the outer jacket comprises a corrugated metal jacketing material and a plurality of springs.

11. The insulated vessel of claim 7, further comprising a skirt portion positioned proximate a base portion of the vessel.

12. The insulated vessel of claim 11, wherein the skirt portion comprises a plurality of springs connected to the plurality of straps, and wherein the plurality of springs is configured to allow for vertical expansion of the vessel insulation system during operation.

13. A vessel insulation system comprising:
a floating ring sized to circumscribe a top nozzle of a vessel;
a plurality of straps connected to the floating ring, the plurality of straps extending from the floating ring and positioned to run along a length of an outer shell of the vessel; and
a plurality of segmented rings connected to the plurality of straps and positioned to circumscribe the outer shell of the vessel, each of the plurality of segmented rings having a vertically facing support surface to vertically support a weight of a segment of insulation material when positioned thereon and along the outer shell.

14. The vessel insulation system of claim 13, wherein the vertically facing support surface extends outward from the outer shell of the vessel.

15. The vessel insulation system of claim 14, wherein the vertically facing support surface of each of the plurality of segmented rings is positioned substantially perpendicular to the plurality of straps.

16. The vessel insulation system of claim 14, wherein the vertically facing support surface of each of the plurality of segmented rings further is positioned to extend radially outward from the outer shell relative to a longitudinal axis of the vessel.

17. The vessel insulation system of claim 13, wherein each of the plurality of segmented rings is fastened to one or more of the plurality of straps via one or more curved plates.

18. The vessel insulation system of claim 13, wherein the plurality of segmented rings is suspended by the plurality of straps.

\* \* \* \* \*